US009158012B2

(12) United States Patent
Willis et al.

(10) Patent No.: US 9,158,012 B2
(45) Date of Patent: Oct. 13, 2015

(54) SYSTEM AND METHOD FOR DETECTING AND POSITIONING A RADIOACTIVE SOURCE

(71) Applicant: University of Tennessee Research Foundation, Knoxville, TN (US)

(72) Inventors: Michael Joseph Willis, Knoxville, TN (US); Steven E. Skutnik, Knoxville, TN (US); Howard L. Hall, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 203 days.

(21) Appl. No.: 14/300,473

(22) Filed: Jun. 10, 2014

(65) Prior Publication Data

US 2014/0361190 A1    Dec. 11, 2014

Related U.S. Application Data

(60) Provisional application No. 61/833,041, filed on Jun. 10, 2013.

(51) Int. Cl.
*G01T 1/20*    (2006.01)
*G01T 1/203*    (2006.01)
*G01T 1/29*    (2006.01)

(52) U.S. Cl.
CPC ............. *G01T 1/2907* (2013.01); *G01T 1/20* (2013.01)

(58) Field of Classification Search
CPC .............................. G01T 1/20; G01T 1/2907
See application file for complete search history.

(56) References Cited

U.S. PATENT DOCUMENTS

| 4,172,226 | A  | * | 10/1979 | Rubin ........................... 250/394 |
| 7,470,909 | B2 |   | 12/2008 | Larsson et al. |
| 8,067,742 | B2 | * | 11/2011 | Winso et al. .................. 250/367 |

OTHER PUBLICATIONS

Carey L. Larsson and Salah Djeffal; "Development of a Directional Gamma Ray Probe"; Nuclear Science Symposium Conference Record; IEEE 2005; pp. 16-18; Canada.
J.H. Ely, E.R. Siciliano, and R.T. Kouzes; "Comparison of NaI(Tl) Scintillators and High Purity Germanium for Vehicle Portal Monitor Applications"; In 2004 IEEE Nuclear Science Symposium Conference Record, 3; 1584-1587; vol. 3, 2004.
Hyun Kim Kwang, Ji Hong Chang, Young Hyun Jung; "Nuclear Material Monitoring System (NMMS) for Security Screens" Nuclear Instruments and Methods in Physics Research Section A: Accelerators, Spectrometers, Detectors and Associated Equipment 648 Supplement 1 (Aug. 21, 2011): S46-S48.
H. Ishibuchi, R. Fujioka, H. Tanaka; "Neural Networks That Learn from Fuzzy If-Then Rules"; IEEE Transactions on Fuzzy Systems 1, No. 2; May 1993; 85-97.
J.J. Saade and H.B. Diab; "Defuzzification Techniques for Fuzzy Controllers" IEEE Transactions on Systems, Man and Cybernetics, Part B: Cybernetics 30, No. 1 (Feb. 2000): 223-229.

(Continued)

*Primary Examiner* — Mark R Gaworecki
(74) *Attorney, Agent, or Firm* — Kenyon & Kenyon LLP

(57) ABSTRACT

The present disclosure describes systems and methods for the detection and positioning of a radioactive source. In an exemplary embodiment, a detector array is placed in a four-quadrant formation to allow for self-shielding of the individual detectors from the radiation emitted by a radiation source. A further embodiment utilizes a fuzzy logic system and method to analyze the gross count response of each individual detector with respect to the other three to thereby determine a generalized location and direction of a radioactive source.

34 Claims, 40 Drawing Sheets

(56) References Cited

OTHER PUBLICATIONS

D.C. Stromswold, J.W. Darkoch, J.H. Ely, R.R. Hansen, R.T. Kouzes, B.D. Milbrath, R.C. Runkle, et al.; "Field tests of a NaI(TI)-based Vehicle Portal Monitor at Border Crossings"; 2004 IEEE Nuclear Science Symposium Conference Record,1: 196-200 vol. 1, 2004.

D.C. Stromswold, E.R. Siciliano, J.E. Schweppe, J.H. Ely, B.D. Milbrath, R.T.Kouzes, B.D. Geelhood et al.; "Comparison of Plastic and NaI(TI) Scintillators for Vehicle Portal Monitor Applications" In 2003 IEEE Nuclear Science Symposium Conference Record, 2:1065-1069; vol. 2, 2003.

L.A. Zadeh; "Fuzzy Logic = Computing with Words." IEEE Transactions on Fuzzy Systems 4, No. 2 (May 1996): 103-111.

* cited by examiner

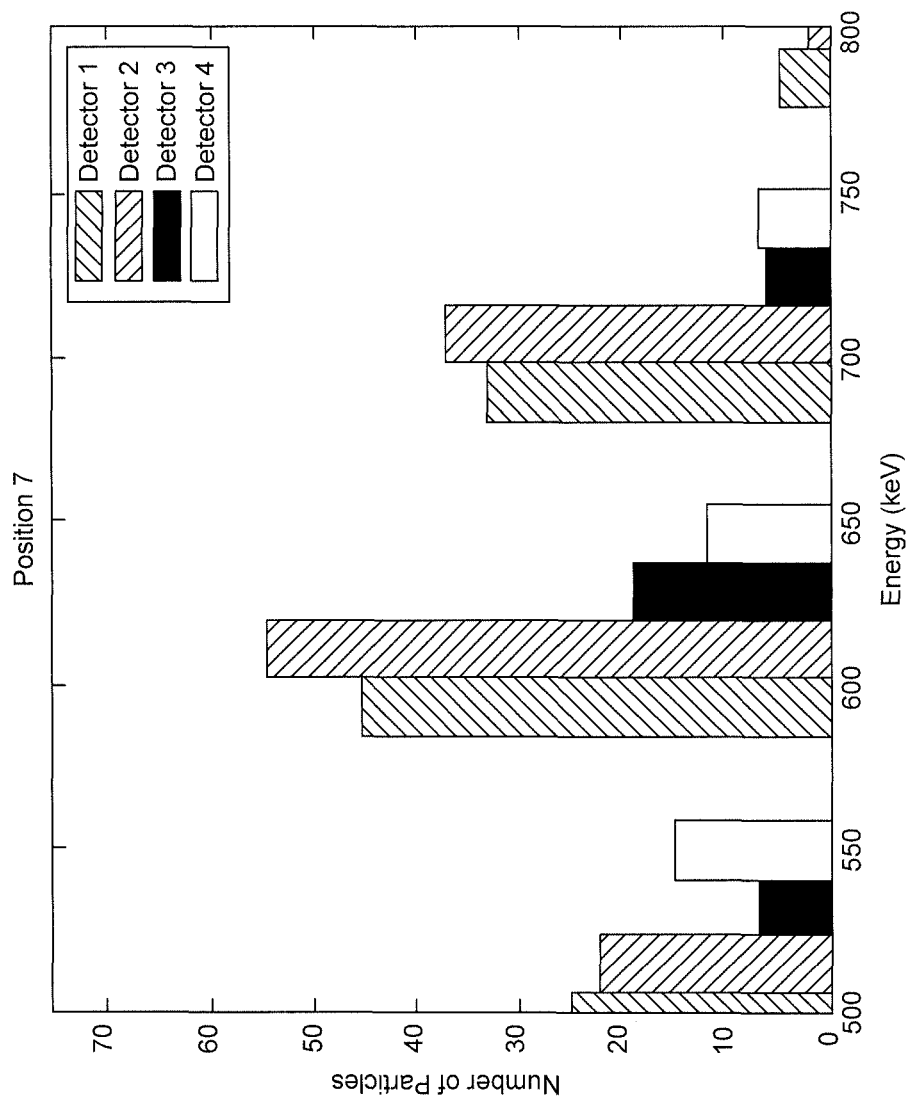

| RULE | DETECTOR 1 | DETECTOR 2 | DETECTOR 3 | DETECTOR 4 | OUTPUT POSITION |
|---|---|---|---|---|---|
| 1 | HIGH | LOW | LOW | HIGH | 0 |
| 2 | HIGH | LOW/MID | LOW | MID/HIGH | 1 |
| 3 | HIGH | MID | LOW | MID | 2 |
| 4 | HIGH | MID/HIGH | LOW | LOW/MID | 3 |
| 5 | HIGH | HIGH | LOW | LOW | 4 |
| 6 | MID/HIGH | HIGH | LOW/MID | LOW | 5 |
| 7 | MID | HIGH | MID | LOW | 6 |
| 8 | LOW/MID | HIGH | MID/HIGH | LOW | 7 |
| 9 | LOW | HIGH | HIGH | LOW | 8 |
| 10 | LOW | MID/HIGH | HIGH | LOW/MID | 9 |
| 11 | LOW | MID | HIGH | MID | 10 |
| 12 | LOW | LOW/MID | HIGH | MID/HIGH | 11 |
| 13 | LOW | LOW | HIGH | HIGH | 12 |
| 14 | LOW/MID | LOW | MID/HIGH | HIGH | 13 |
| 15 | MID | LOW | MID | HIGH | 14 |
| 16 | MID/HIGH | LOW | LOW/MID | HIGH | 15 |

Fig. 15

| | Fuzzy Logic Inputs Based On 0-100 Scale For Smooth Curves | | | | |
|---|---|---|---|---|---|
| Cs-137 662 keV | [100 0 0 100] | [100 75 0 25] | [100 100 0 15] | [65 100 75 0] | [0 100 100 0] |
| Na-22 1274 keV    511 keV | [100 0 0 100] | [100 75 0 70] | [100 100 0 0] | [50 100 50 0] | [0 100 90 0] |
| Co-60 1173 keV    1332 keV | [100 0 0 100] | [50 100 0 50] | [20 100 20 0] | [100 100 100 0] | [0 100 100 20] |
| Known Position | 0 | 4 | 7 | 10 | 13 |

Fig. 16

| Fuzzy Logic Outputs Corresponding to Fig. 16 Inputs | | | | | |
|---|---|---|---|---|---|
| Cs-137 662 keV | 0.17 | 4.32 | 6.75 | 10.6 | 12.8 |
| Na-22 1274 keV  511 keV | 0.17 | 2.94 | 6.75 | 10.6 | 12.8 |
| Co-60 1173 keV  1332 keV | 0.17 | 6.79 | 10.6 | 10.1 | 12.4 |
| Known Position | 0 | 4 | 7 | 10 | 13 |

Fig. 17

SYSTEM AND METHOD FOR DETECTING AND POSITIONING A RADIOACTIVE SOURCE

RELATED AND CO-PENDING APPLICATIONS

This application claims priority to U.S. provisional application entitled "Detection and Positioning of Radioactive Sources in Motion Using a Four-Detector Response Algorithm", Ser. No. 61/833,041, filed 10 Jun. 2013, the entirety of which is hereby incorporated herein by reference.

BACKGROUND

With the wider use of nuclear materials in the present day, nuclear security has grown increasingly important given concerns about the potential availability of such materials to terrorist groups. To safeguard the public against the misuse of such radioactive materials, detection devices that are capable of thwarting such attacks must be further refined, developed, and implemented. Some current systems for detecting and positioning radioactive materials are inflexible in how they can be deployed and therefore are limited to portals, choke points, or other immobile uses. Other current systems suffer from a number of drawbacks, such as high expense, lack of positioning accuracy, slow responsiveness, are limited to a particular energy range, etc. Accordingly, there is a need for an approach that is mobile and more cost efficient than traditional portal monitors. Additionally, mobile detection systems would facilitate a more timely response to a potential threat.

SUMMARY

The present disclosure presents a number of approaches to the above-described problem including an embodiment using four 2 in.×4 in. sodium iodide (NaI) detectors and a Pixie-4 data acquisition system ("DAQ"). In this particular embodiment, NaI detectors are used rather than high-purity germanium (HPGe) of plastic scintillators due to their comparatively low cost and ruggedness, while still maintaining sufficient resolution and isotopic identification capabilities. In an exemplary embodiment, NaI detectors are placed in a four-quadrant formation to allow for self-shielding of the individual detectors. A further embodiment utilizes a fuzzy logic system to analyze the gross count response of each individual detector with respect to the other three to thereby determine a generalized location and direction of a radioactive source. In other embodiments, plastic scintillators are used with shielding arranged between the detector devices.

BRIEF DESCRIPTION OF THE DRAWINGS

FIGS. 10a-10e are bar graphs of histogram response for a Cs-137 source at various positions according to an embodiment of the present subject matter.

FIG. 15 is a table containing exemplary fuzzy logic rules according to an embodiment of the present subject matter.

FIG. 16 is a table showing fuzzy logic inputs from smooth curve data according to an embodiment of the present subject matter.

FIG. 17 is a table showing fuzzy logic position outputs corresponding to the fuzzy logic inputs in FIG. 16 according to an embodiment of the present subject matter.

DETAILED DESCRIPTION

Figure 1:
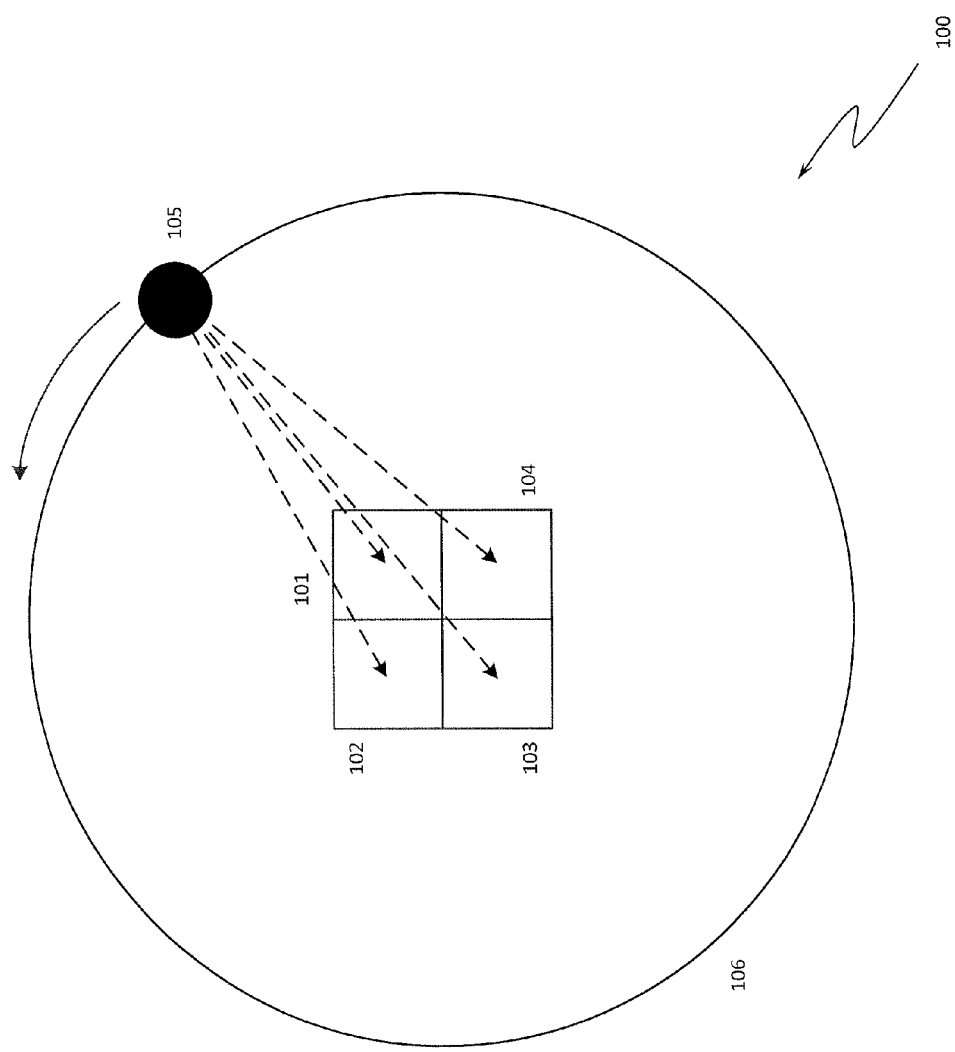
FIG. 1 is a depiction of a simulation model for detecting and positioning a source according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific radiation detection and positioning systems and techniques, it is to be understood that the discussion is not intended to limit the scope of the present subject matter in any way and that the principles presented are equally applicable to other radiation detection and positioning systems and techniques.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for radiation detection and positioning systems and techniques are described.

The present disclosure describes novel systems and methods for a radiation detection system capable of determining the presence and relative location of a radiological source of unknown energy level. In an embodiment, four sodium iodide (NaI) detectors are placed together as an array in a square four-quadrant structure. Placing the detector array in the center of a semicircle and dividing the semicircle into segments allows each location of the semicircle to have a specific intensity response for each detector. A comparison of the intensity for each detector allows for the relative location of the radiological source to be determined. Computer models, such as a Monte Carlo N-Particle ("MCNP") code model may be used to compare experimental results to ideal responses from the models. A fuzzy logic system may be set up which utilizes the MCNP results as a standard for determining a source location output based off experimental inputs. As determined, the system results verify that detectors closest to a source register more radiation events than those further away due to the proximity to the source and shielding from the closer detectors. The fuzzy logic system uses each detector's intensity to create a location and directional result for the source.

Methodology and Setup of System

The methodology behind this type of detection system is centered on how each detector's response compares to those of the other three. Each detector shields the other detector units depending on the direction in which the source is located, causing the system as a whole to shield itself. The effectiveness of this system is based on how well the differential pulse height spectra ("DPHS") of the separate detectors can be evaluated in comparison to the others. As is known in the art, a differential pulse height spectrum is a histogram of events deposited in a detector separated into ranges of energies. Different radioisotopes have specific energies that are emitted in a particular proportion and cause distinctive peak heights in the spectra.

In an embodiment, the detectors used were 2 inch by 4 inch NaI detectors and the signals were processed by a data acquisition system, such as a Pixie-4 data acquisition system. To simulate a moving source, a simulation model 100 shown in FIG. 1 having a 1:48 scale O-model train was used to move the source 105 at a constant velocity around an 18-inch radius circle of a track 106. The NaI detectors 101, 102, 103, and 104 were placed in the center of the circle with the center of the circle being the origin. For border stations and other vehicle portal monitors, typically the maximum speed allowed to pass through is 5 MPH. This is the ideal speed the detector system would be able to read, but for the nature of the simulation model and speed constraints of the train, the speed of the source was evaluated at nearly 0.5 MPH. This simulation model was only evaluated and verified for the first 180° of the circle due to symmetry.

Figure 2:
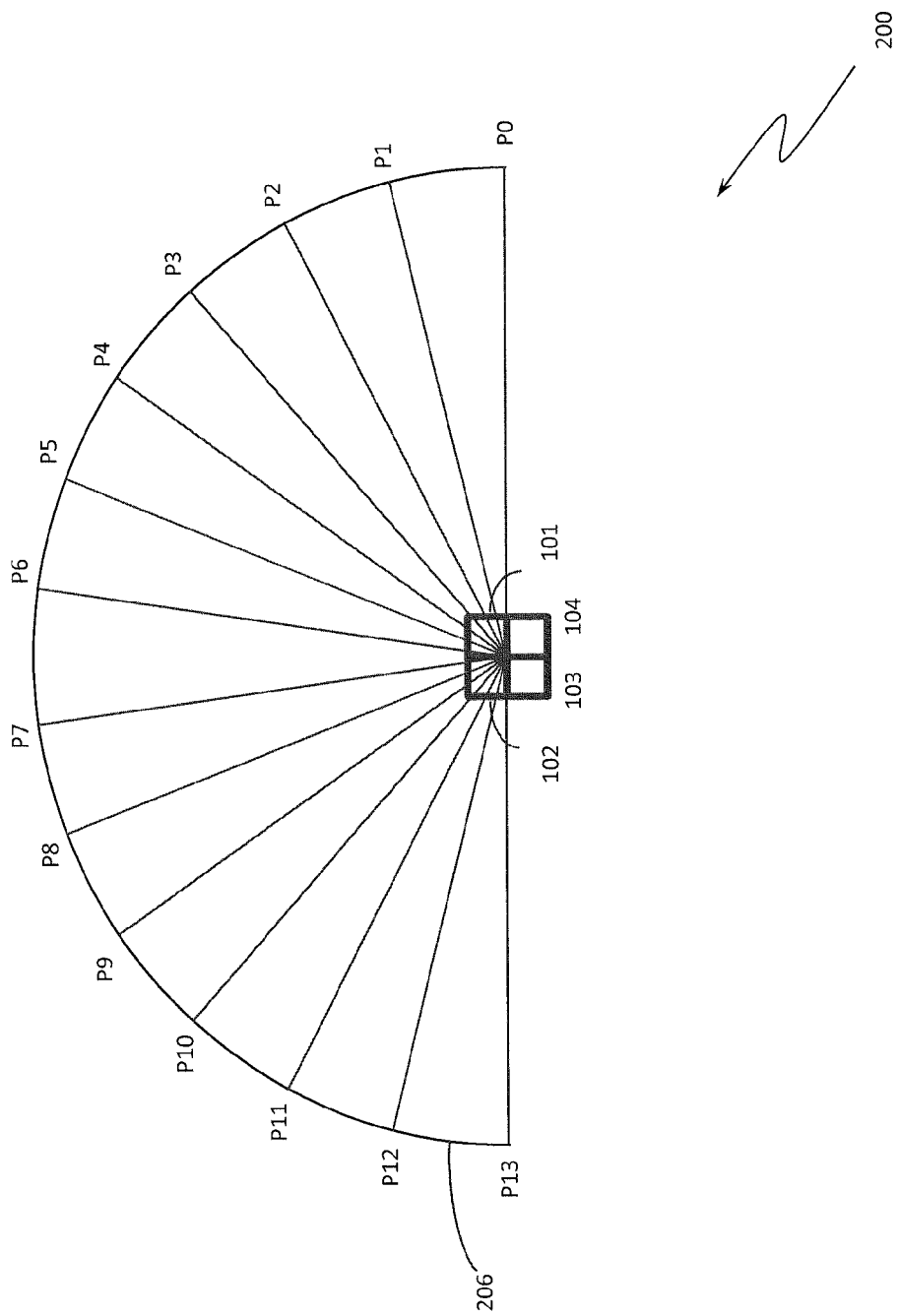
FIG. 2 is an illustration for the partitioning of a semicircle for positioning a source according to an embodiment of the present subject matter.

As the source 105 travels around the top half of the track 106, the position of the source is determined by, for example, dividing the top half of the track, semicircle 206, into thirteen equal segments as shown in FIG. 2. Those of skill in the art will readily understand that the more segments created and evaluated, the more precise direction one can determine of the source. With position zero (P0) being equal to the 0° point and position 13 (P13) being equal to 180°, the thirteen segments are evenly spaced between those two points as shown in FIG. 2. The four detectors 101-104 may be placed adjacent to each other in a square formation at the center of track 106, as shown in FIG. 1, and in this arrangement each detector is associated with a particular geometric quadrant, e.g., detector 101 with quadrant 1, detector 102 with quadrant 2, detector 103 with quadrant 3, and detector 104 with quadrant 4, as is known in the art. With the source located at the zero position P0, detectors 101 and 104 should register the most counts. This is due to the close proximity of these detectors to the source and an unhindered path of travel between the source and these detector faces. Detectors 102 and 103, however, are shielded by detectors 101 and 104 which are located between detectors 102 and 103 and the source at P0. This causes the gamma particles emitted by the source to be attenuated by detectors 101 and 104. It is this blocking of particles that causes the system as a whole to be considered self-shielding to itself between the distinct detectors. The response of the detectors with respect to each other is different for each location around the semicircle 206. Using the amount of particles detected by each detector, the position of the source can therefore be determined.

Modeling of System

The system was modeled in MCNP5 to create an algorithmic response for energies ranging from 100 keV to 2700 keV to cover nearly all gamma ray energies that would be of concern for nuclear security purposes from low energy x-rays to higher energy gammas from thorium decay chain products. The source code execution was performed for each of the individual fourteen locations around the semicircle 206 to simulate a moving source/particle. While at each location, the code was run for a time of 0.5 seconds to simulate a 10-microcurie isotropic source moving along the semicircle 206 at 0.5 MPH. A DPHS was generated for each location to determine the amount of particles deposited in each of detector 101-104. Although outside influence can affect the response of the system, this MCNP model was used to create ideal response curves for each of the energies modeled.

Model Analysis

Figure 3:
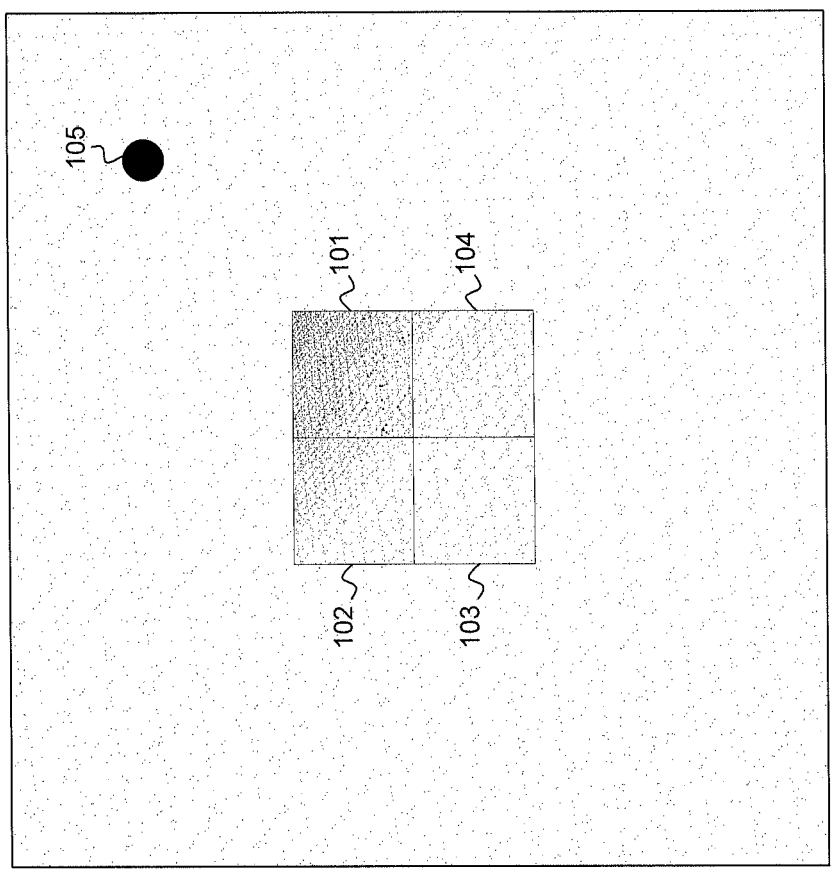
FIG. 3 is an illustration showing stopped gamma particles by detectors in a detector array according to an embodiment of the present subject matter.
Figure 4B:
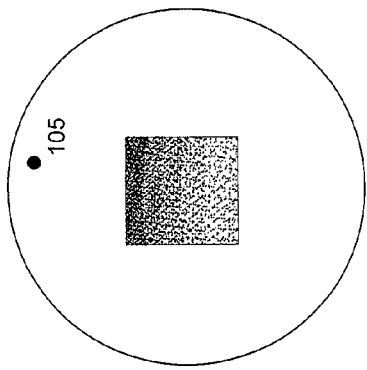
FIGS. 4a-4f are illustrations showing detector responses for various positions of a source according to an embodiment of the present subject matter.
Figure 4E:
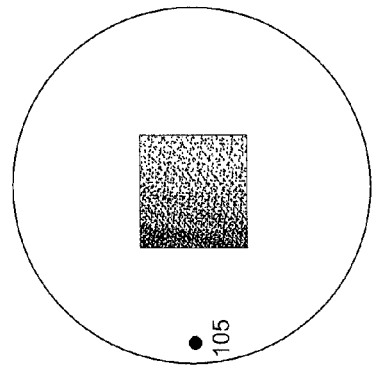
Figure 4A:
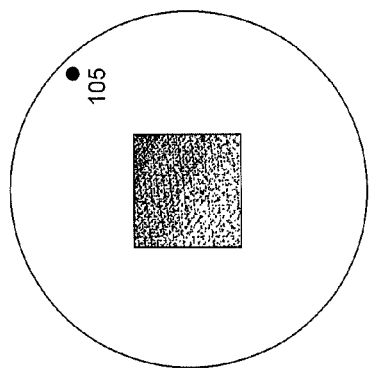
Figure 4D:
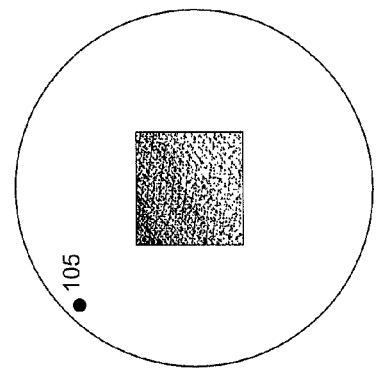
Figure 4C:
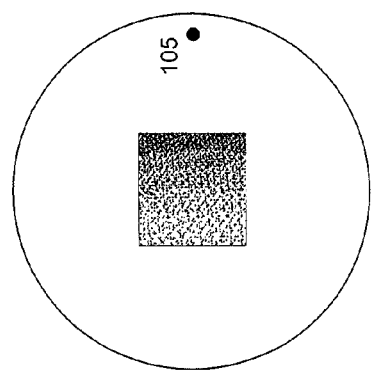
Figure 4F:
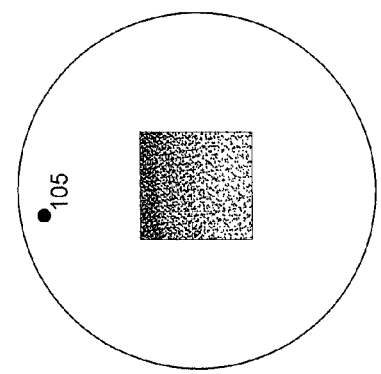

The first goal of the model was to verify the assumption that the system was capable of self-shielding using the separate detectors 101-104. Modeling the source 105 at a corner of the detection system made it easy to view how the system would respond. The code was run using MCNP5 and viewed with the Visual Editor program that accompanies MCNP5. The results from this run are shown in FIG. 3. From FIG. 3, it is evident that the response of the system behaves as expected. The dots by/within detectors 101-104 show detected or stopped gamma particles. Additionally, FIG. 3 shows dots located outside the detectors and these dots correspond to particles stopped by the air. The detector closest to the source 105, detector 101, has the most particles inside of it, whereas the detector farthest from the source, detector 103, has the least. This is expected due to the self-shielding of the system. The other two detectors, detectors 102 and 104, appear to have approximately the same amount of particles deposited in each. This is also as expected due to the symmetry of the system shown in FIG. 3.

With the self-shielding assumption verified, the next step was to apply this mechanism to the actual system. The source 105 was placed 18 inches from the detectors' centroid, beginning at position zero and ending at position 13 of the semicircle 206. The Visual Editor results from some of the positions of this run are shown in FIGS. 4a-4f where labels of the detectors have been omitted for clarity.

Figure 5A:
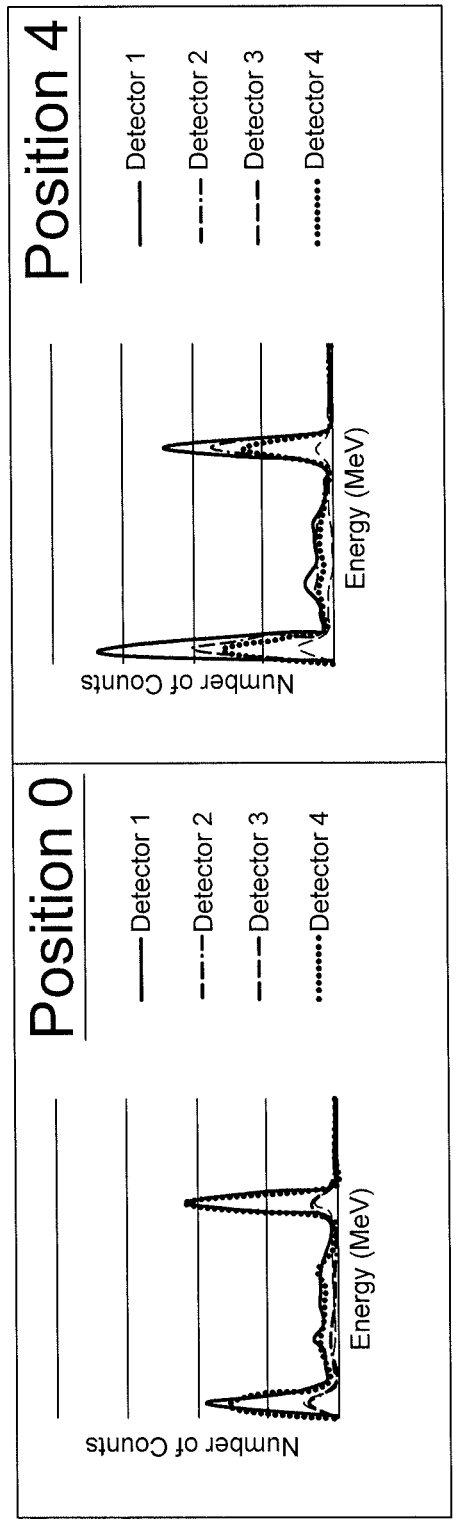
FIGS. 5a-5c are graphs of Differential Pulse Height Spectra for a source at various positions according to an embodiment of the present subject matter.
Figure 5B:
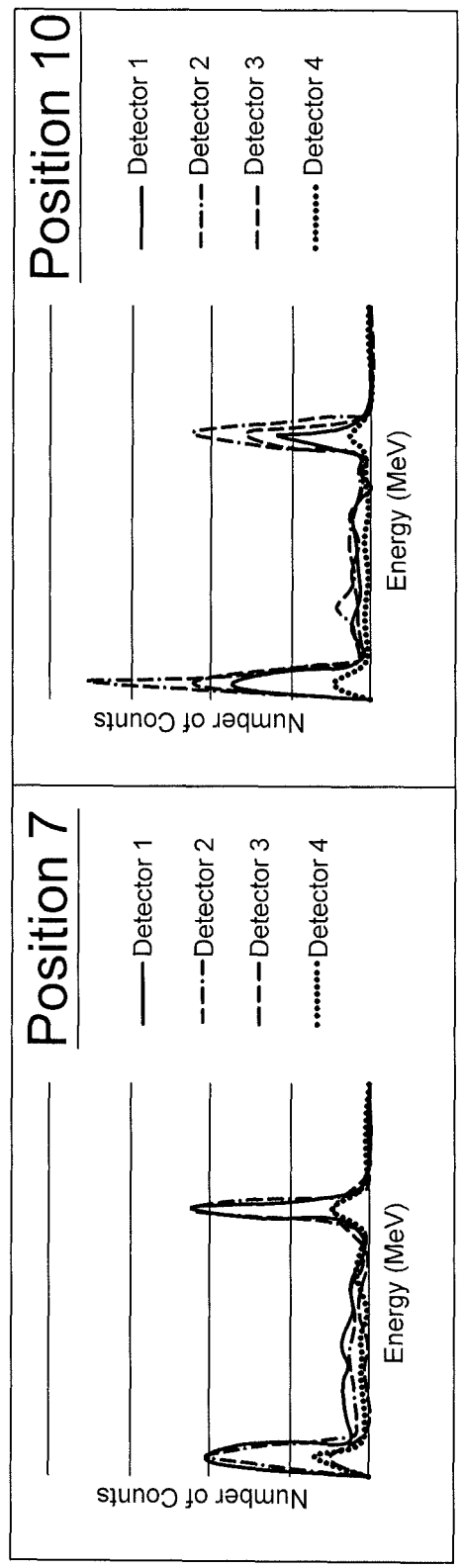
Figure 5C:
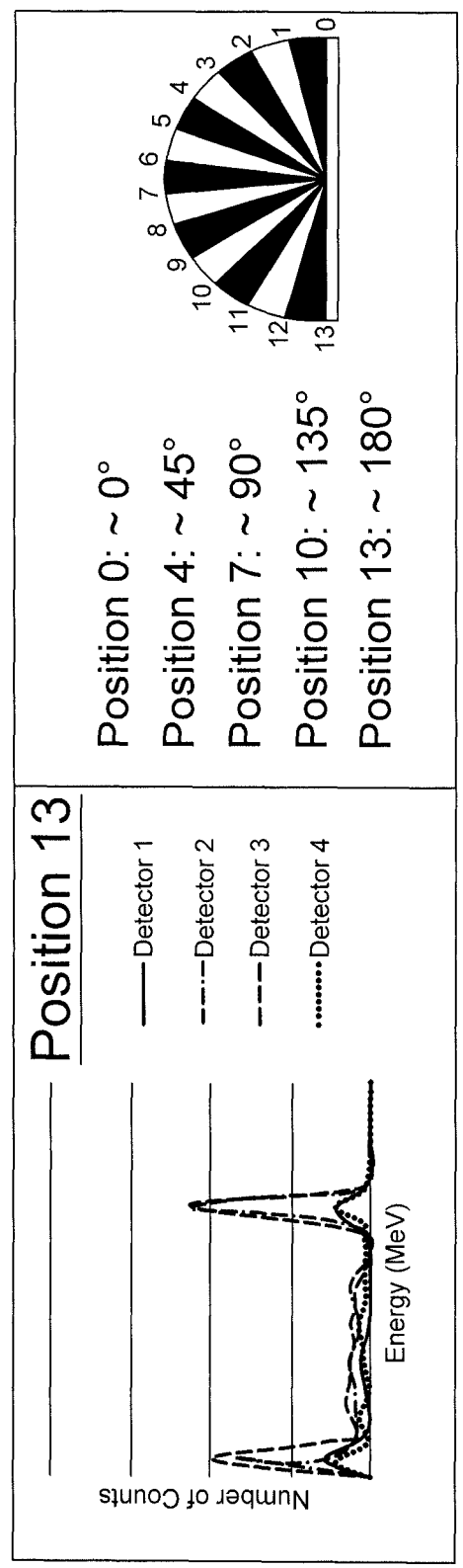

The visual results shown in FIGS. 4a-4f from the source moving around the circle are consistent with the general idea that the detectors closest to the source will detect the most events. At the same time, the detectors farthest from the source prove to detect the least amount of particles. Although the Visual Editor tool allows a user to get a realistic visual of what is occurring in the model, these results do not help in actual comparisons of DPHS. To compare DPHS, one must use the results from MCNP source code execution. The source modeled was a 10 µCi Cesium-137 source that emits a 662 keV gamma ray through Beta decay. From the results, DPHS were extracted and are shown in FIGS. 5a-5c for the same locations as shown in FIGS. 4a-4f. In FIGS. 5a-5c, as well as in other figures presented herein, detectors 1, 2, 3, and 4 correspond to detectors 101, 102, 103, and 104, respectively.

Figure 6:
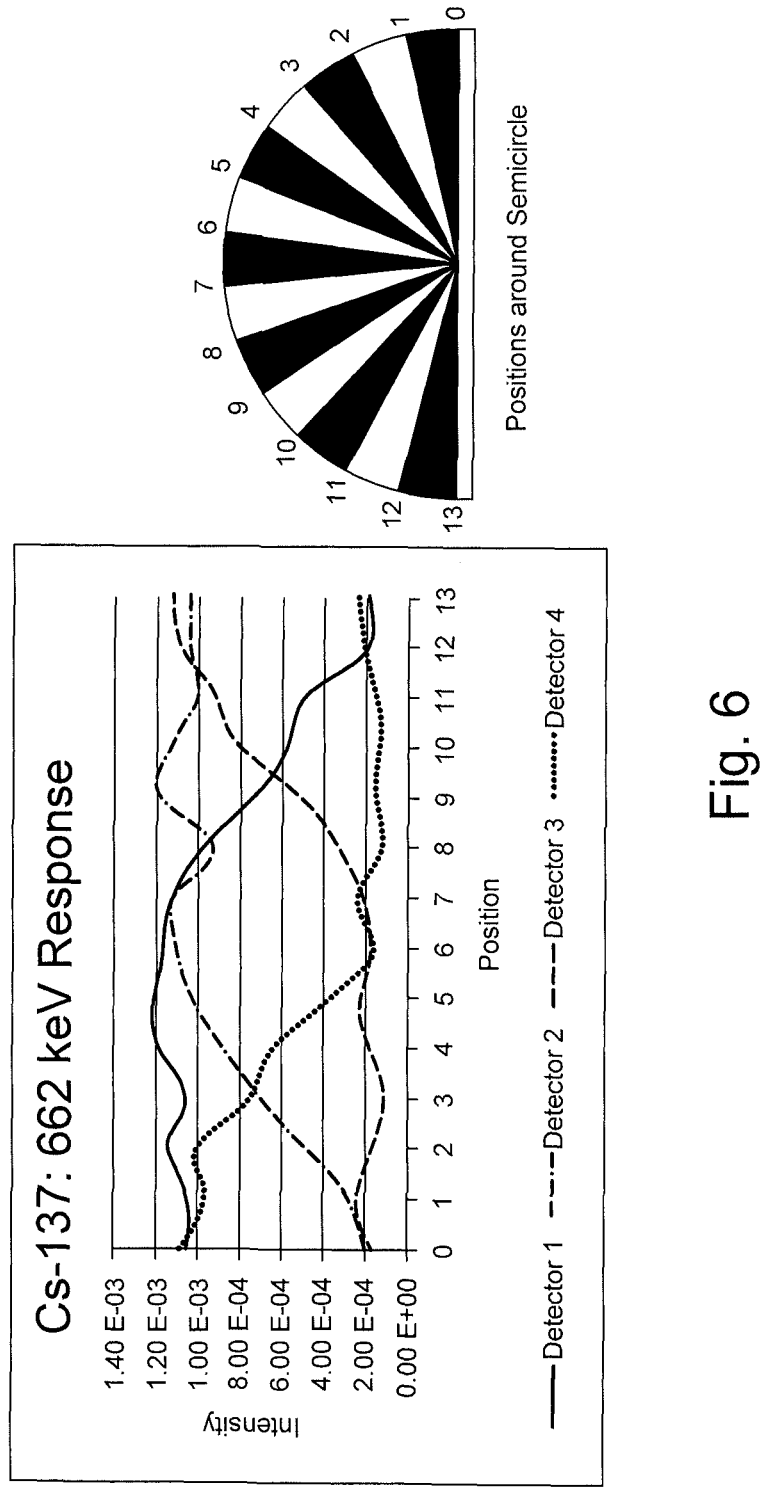
FIG. 6 is a graph of peak intensity responses for a source at various positions according to an embodiment of the present subject matter.

Examination of the differential pulse height spectra in FIGS. 5a-5c verifies that the detector response trend suspected from the Visual Editor results proves to be valid. For each position shown in FIGS. 5a-5c, the DPHS results have two major sets of peaks. The lower energy peak on the left side of each spectrum for each position is suspected to be low energy x-rays coming from the filling of lower electron shells resulting in the x-ray emissions. The higher energy peak on the right side of each spectrum for each position corresponds to the modeled 662 keV gamma particles deposited in the four detectors 101-104. Using the relative intensities or heights of these peaks, each position will have a separate expected set of responses for the detectors 101-104. Starting from 0° (Position 0) and traveling to 180° (Position 13), the height of the individual detectors was recorded. The results from this are shown in FIG. 6.

Comparison of the detector responses at each position shows symmetry in the system that was expected. For example, at position 0, detectors 101 and 104 have larger intensities than detectors 102 and 103. This result is exactly what was expected due to the proximity of the source to detectors and self-shielding. Position 13 yields a similar response, only opposite that of position 0, i.e., detectors 102 and 103 have larger intensities than detectors 101 and 104. Each position around the semicircle yields a response of the detectors that is location specific for the intensities being compared, as shown in FIG. 6.

Figure 7:
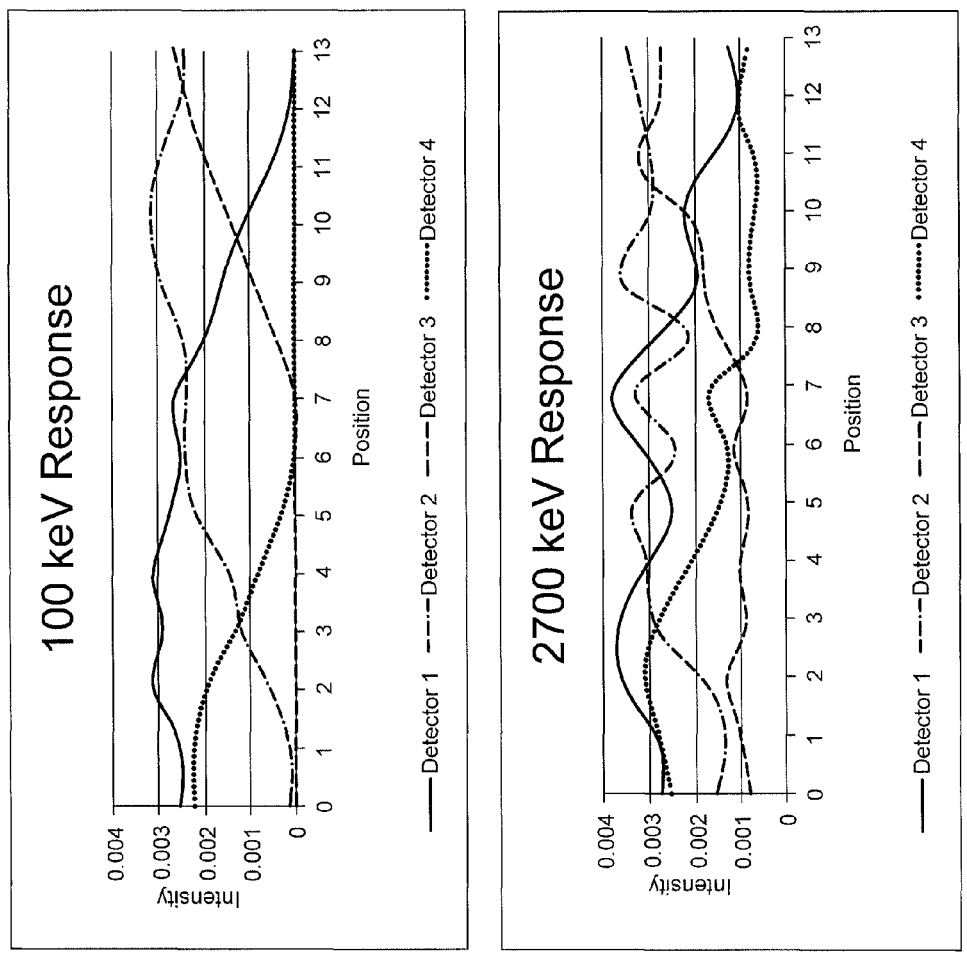
FIG. 7 shows graphs of pulse intensity responses for low and high energies of a source at various positions according to an embodiment of the present subject matter.

An effective detection system needs to have the capabilities of resolving radiation of different energies and be able to respond to a wide range of energies, especially if one is trying to detect an unknown source. To accomplish this, the system was modeled from a range of 100 keV to 2700 keV to cover a wide range of concerning energies from low energy x-rays to high-energy thorium chain products. The responses for the system at 100 keV and 2700 keV are shown in FIG. 7.

Modeling the smallest and largest energies of concern allows one to see the effectiveness of the system over a large range of energies. The plot corresponding to the 100 keV source in FIG. 7 has very distinct response curves for the detectors 101-104 around each position of the semicircle 206. The points along the response curve correspond to the ratio of counts under a 100 keV peak compared to the total number of particles emitted at each position. This is due to the low energy particles being almost fully absorbed by the detectors closer to the source and only slightly penetrating through to the farther detectors from the source. The plot corresponding to the higher energy 2700 keV particles in FIG. 7 shows a similar response, but not as distinct as the for lower energy level particles. This is due to the larger energy gamma rays being able to penetrate the detectors closer to the source more readily than for the lower energy particles. This causes the detectors closer to the source to register fewer events and the further detectors to register more events relative to the closer detectors. When analyzing the counts under each of the various energy peaks, the response curves at the higher energies are less distinct for each position. Nonetheless, the separation of the different detector responses is still large enough to show system validity.

Figure 8:
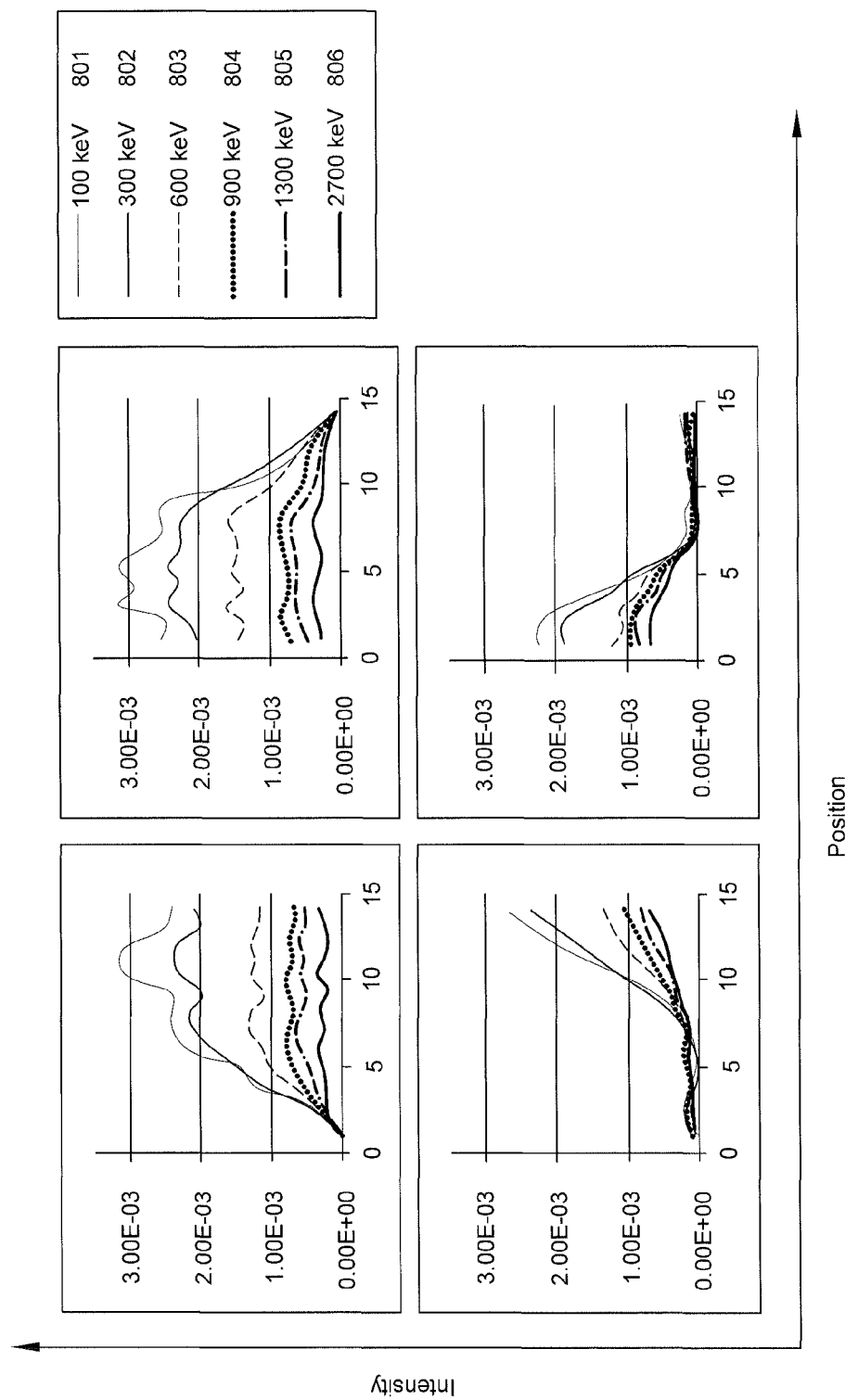
FIG. 8 shows graphs of quadrant response for a spectrum of energies of a source at various positions according to an embodiment of the present subject matter.

To confirm the response curves are similar for all energies within this range, response curves were made for the range of energies of concern in 100 keV increments. To better see the similarities at the different energies, the detector responses were plotted separately in FIG. 8. In FIG. 8, the four plots correspond to the arrangement of detectors 101, 102, 103, and 104 shown in FIG. 1, i.e., the top right plot in FIG. 8 corresponds to detector 101, the top left plot corresponds to detector 102, the bottom left plot corresponds to detector 103, and the bottom right plot corresponds to detector 104. The plots in FIG. 8 correspond to the individual responses of detectors 101-104 at each location around the semicircle 206 for the entire range of energies concerning this system. The trend seen by all four detectors is that the intensities recorded lessen as the energy decreases for each position. The rates at which the intensities decrease are similar for all four detectors. Again, this is expected due to the higher penetrating power of the higher energy gamma rays resulting in fewer events to be registered in the detectors closer to the source.

Figure 9:
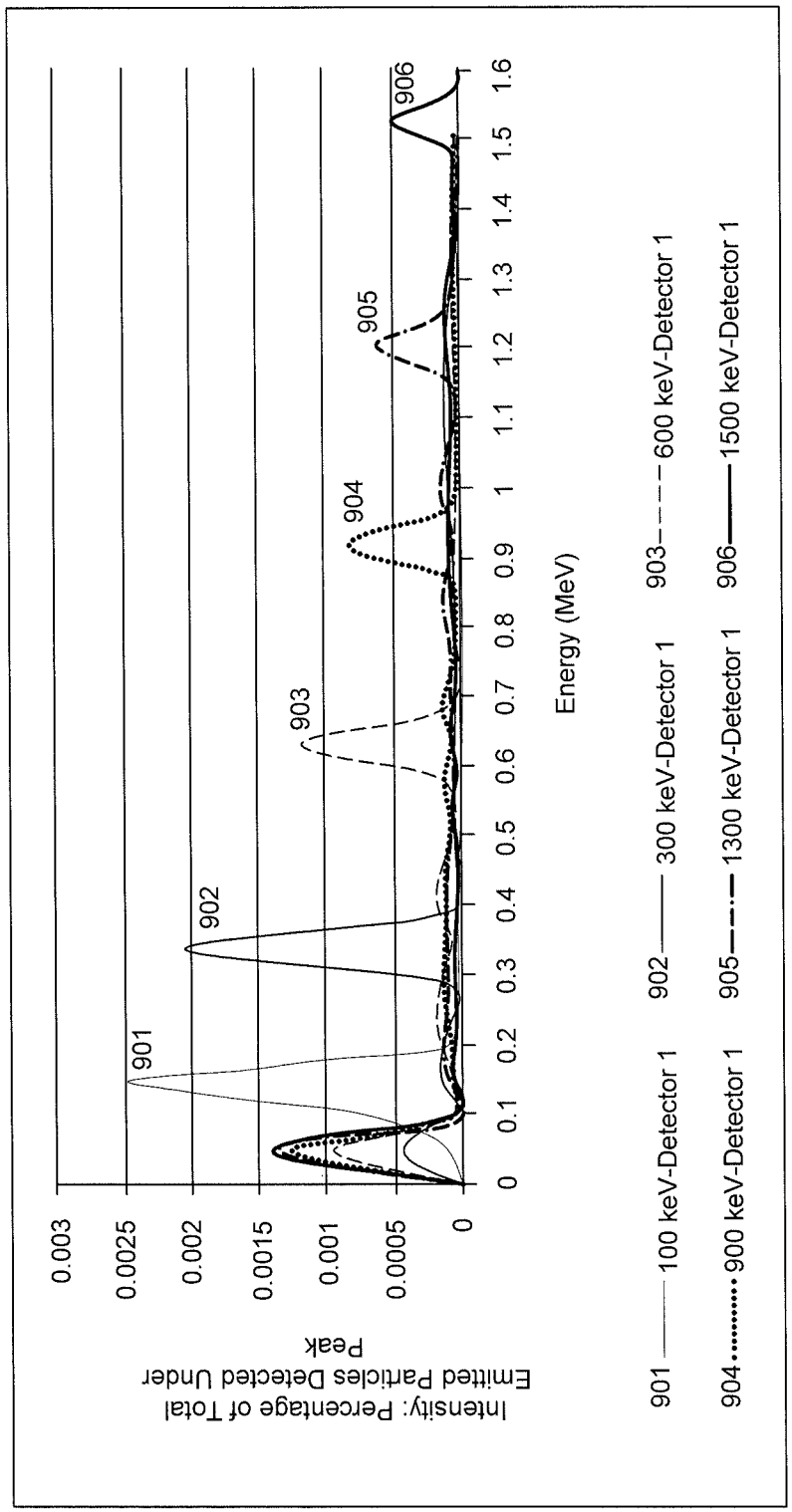
FIG. 9 is a graph comparing Differential Pulse Height Spectra for a detector for a spectrum of energies of a source at a particular position according to an embodiment of the present subject matter.
Figure 10A:
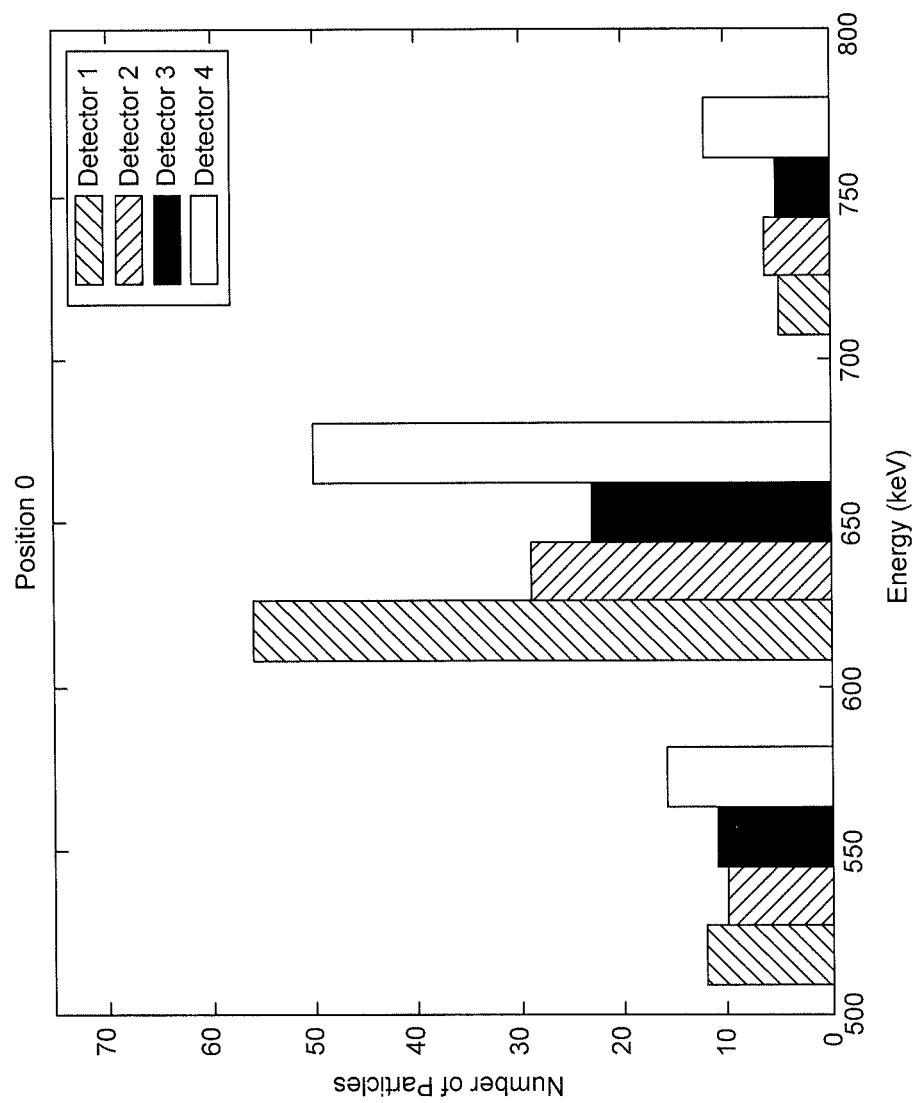
Figure 10B:
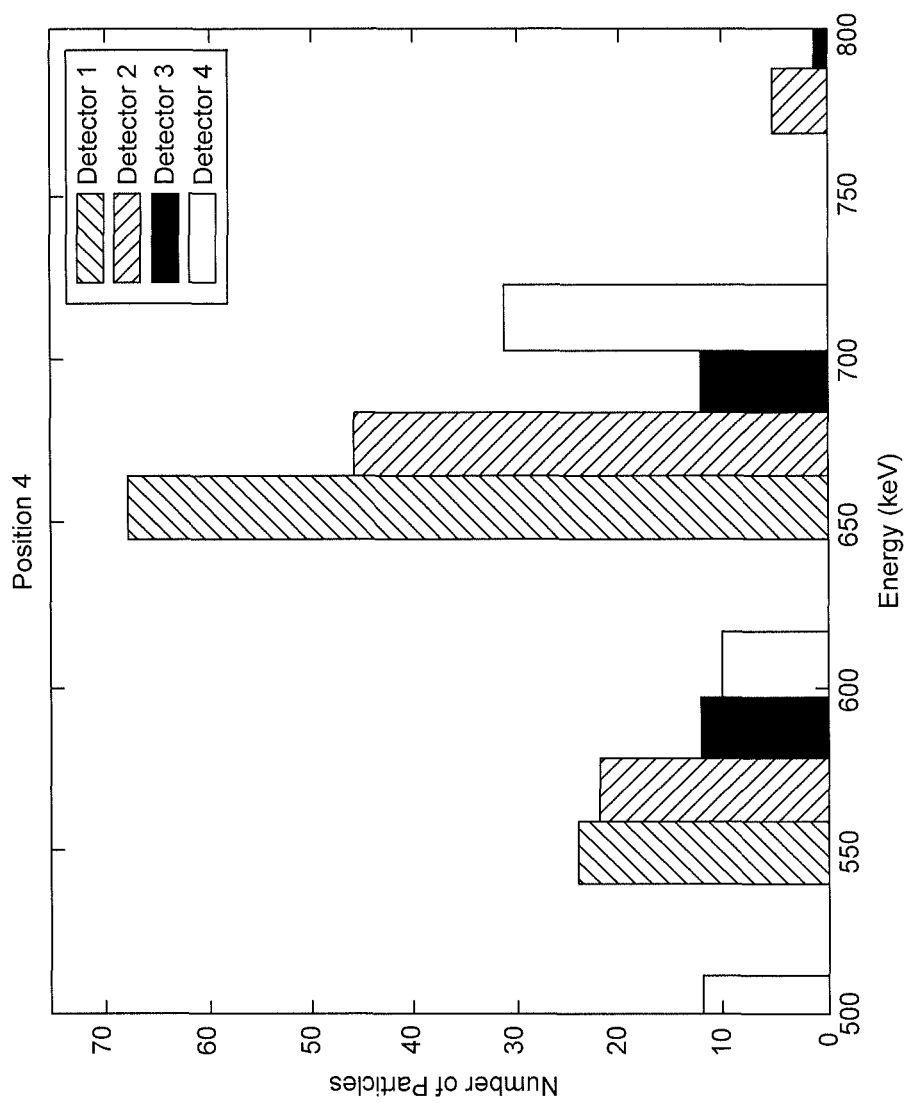
Figure 10D:
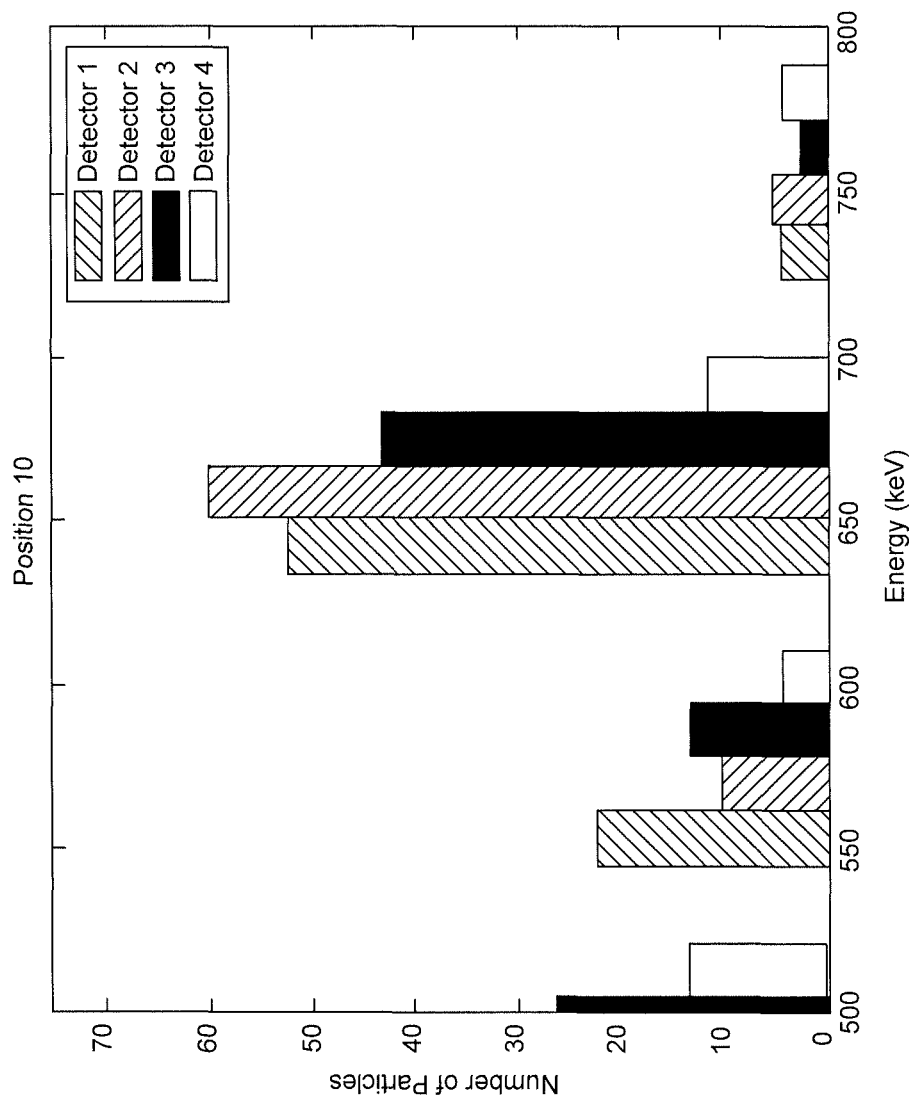
Figure 10E:
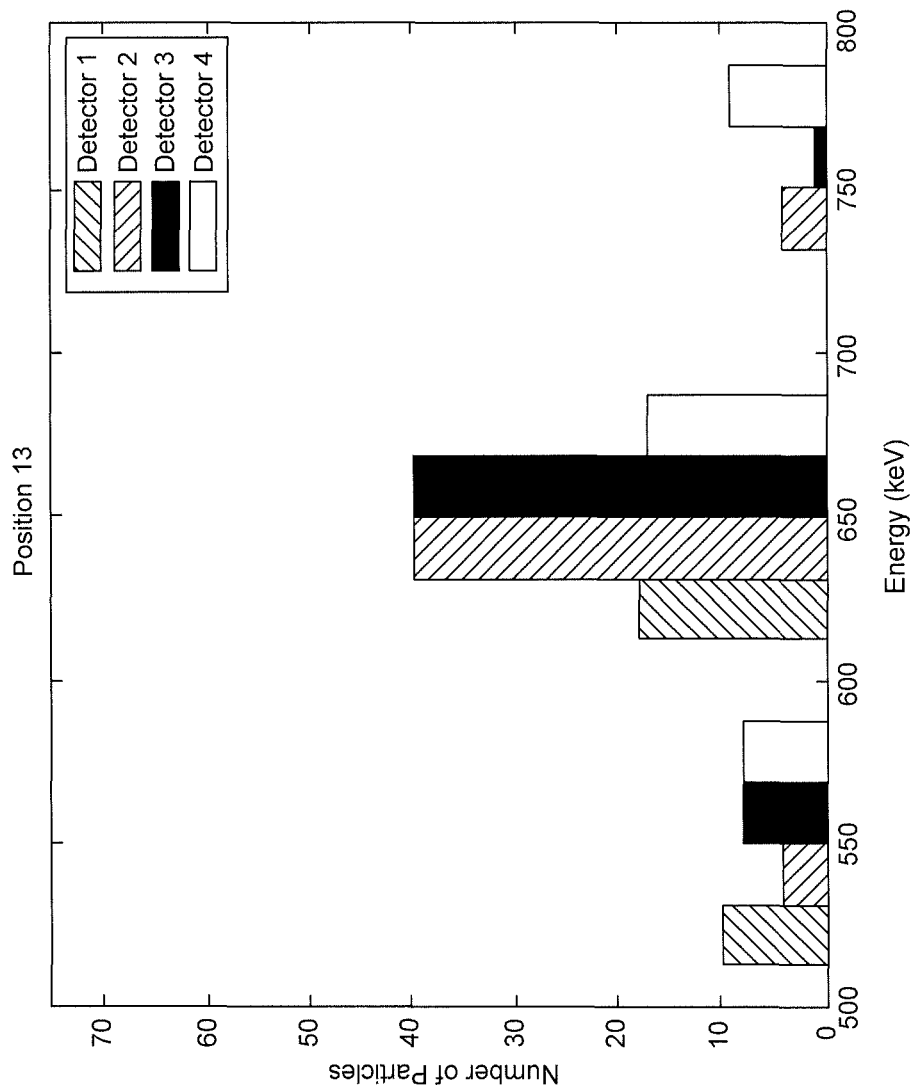
Figure 11A:
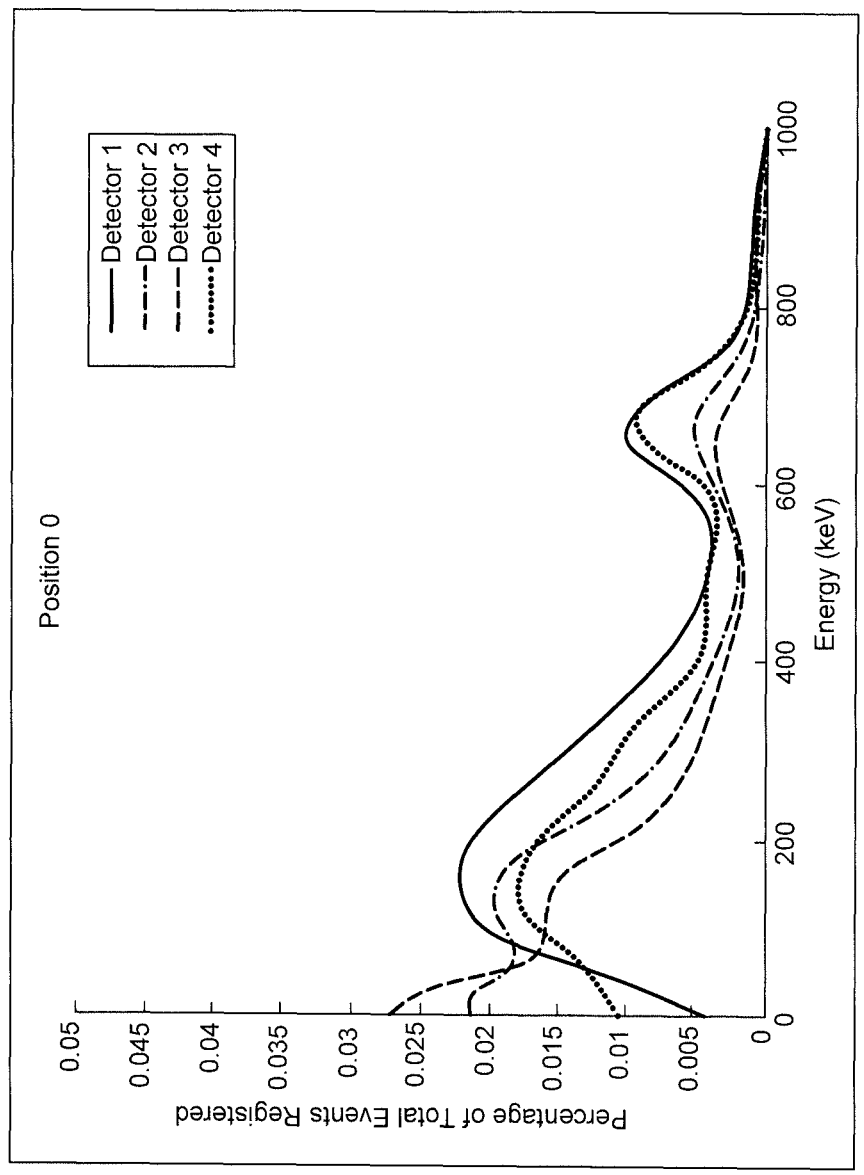
FIGS. 11a-11e are graphs of smooth curve fittings to the histogram responses of FIGS. 10a-10e, respectively, according to an embodiment of the present subject matter.
Figure 11B:
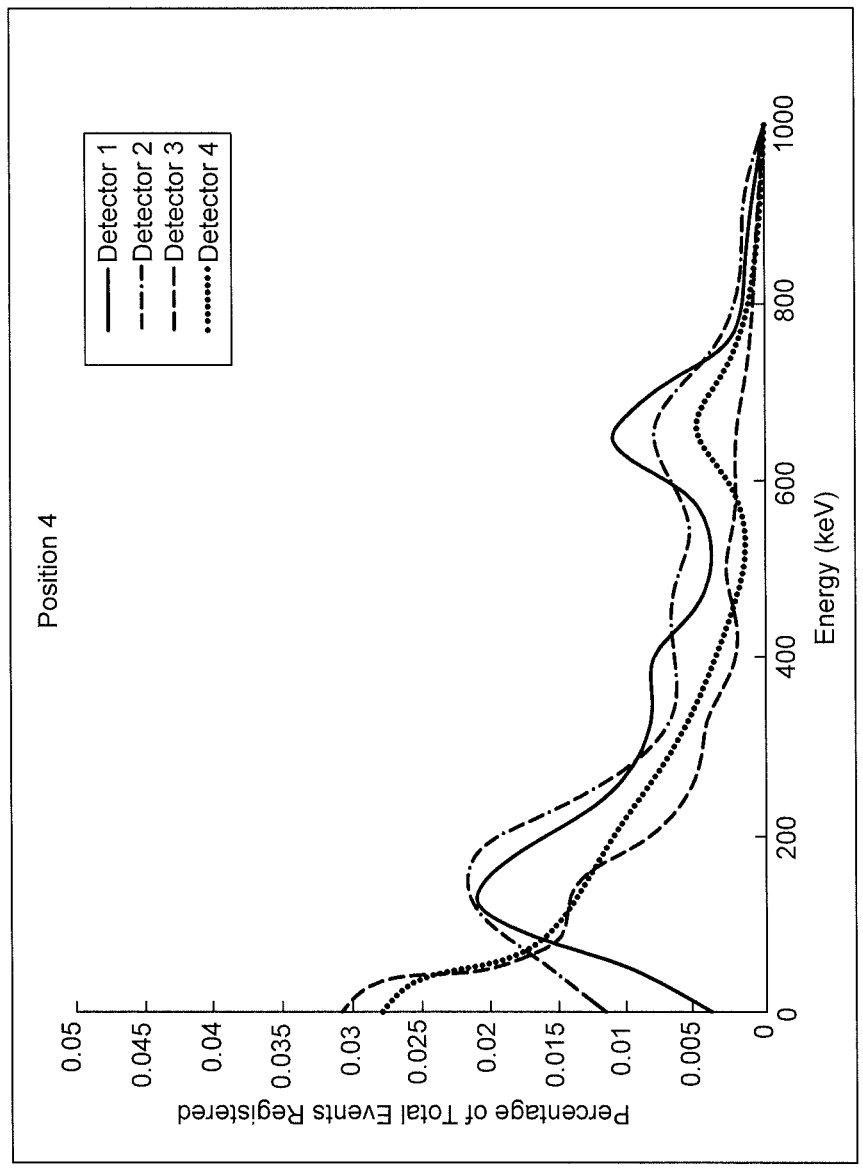
Figure 11C:
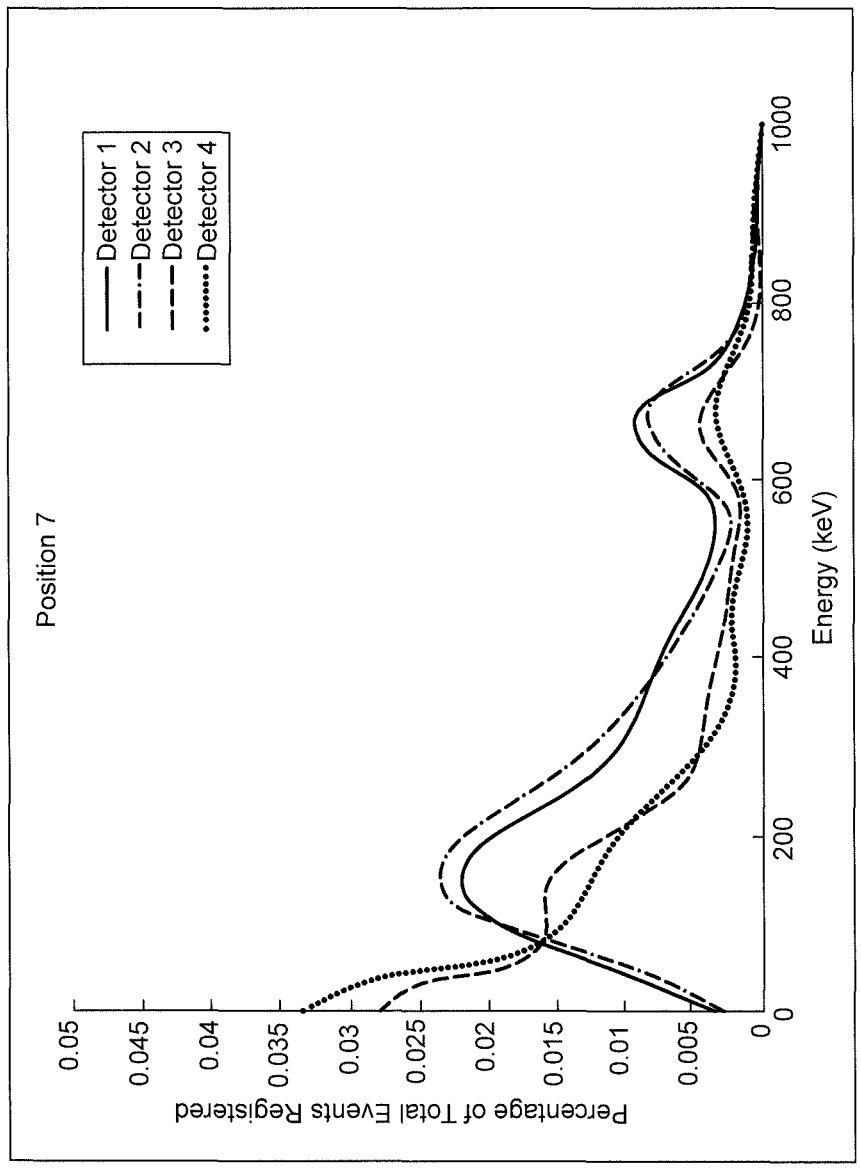
Figure 11D:
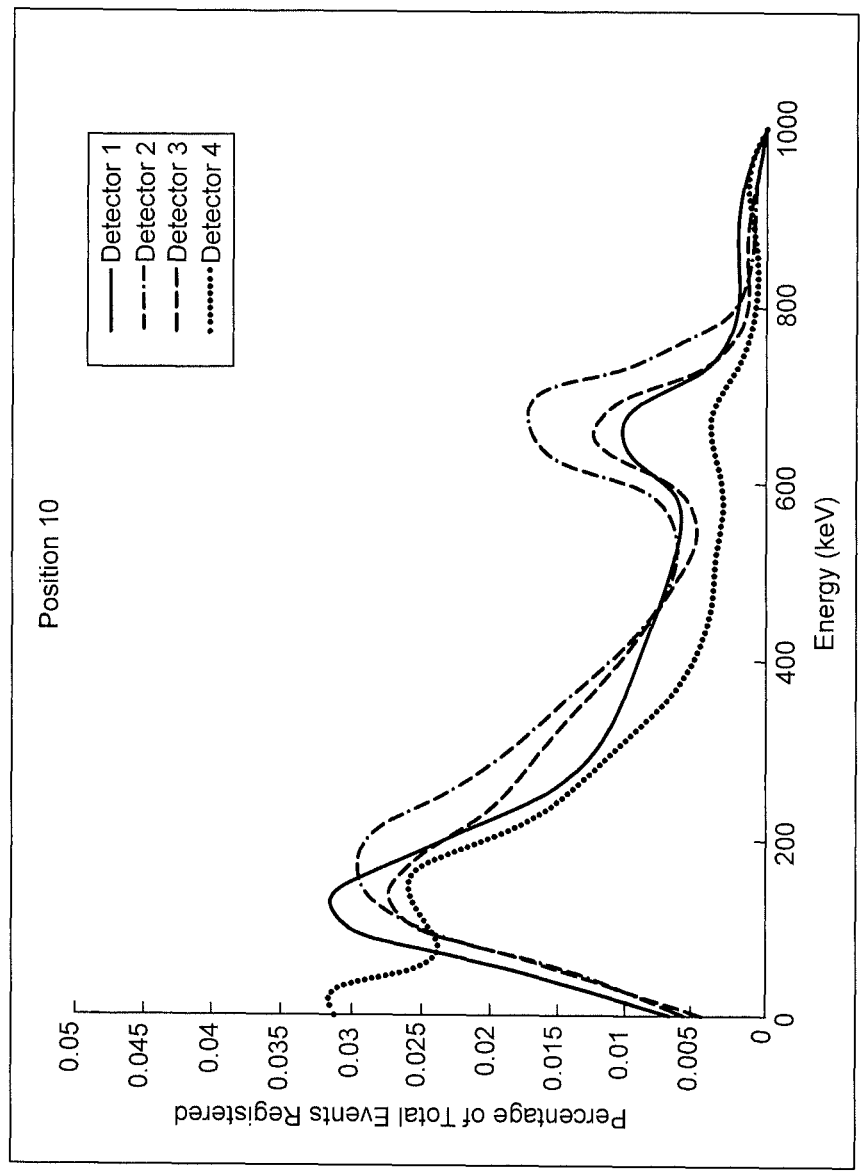
Figure 11E:
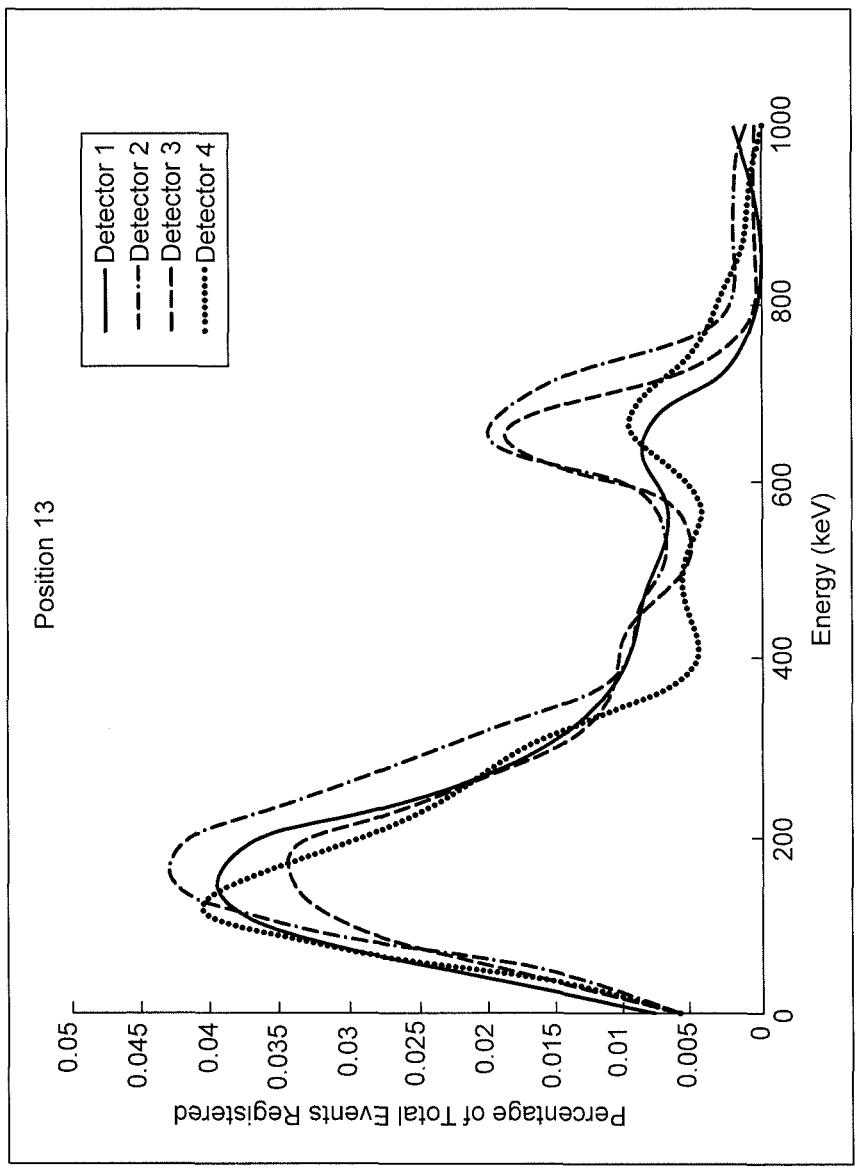
Figure 12A:
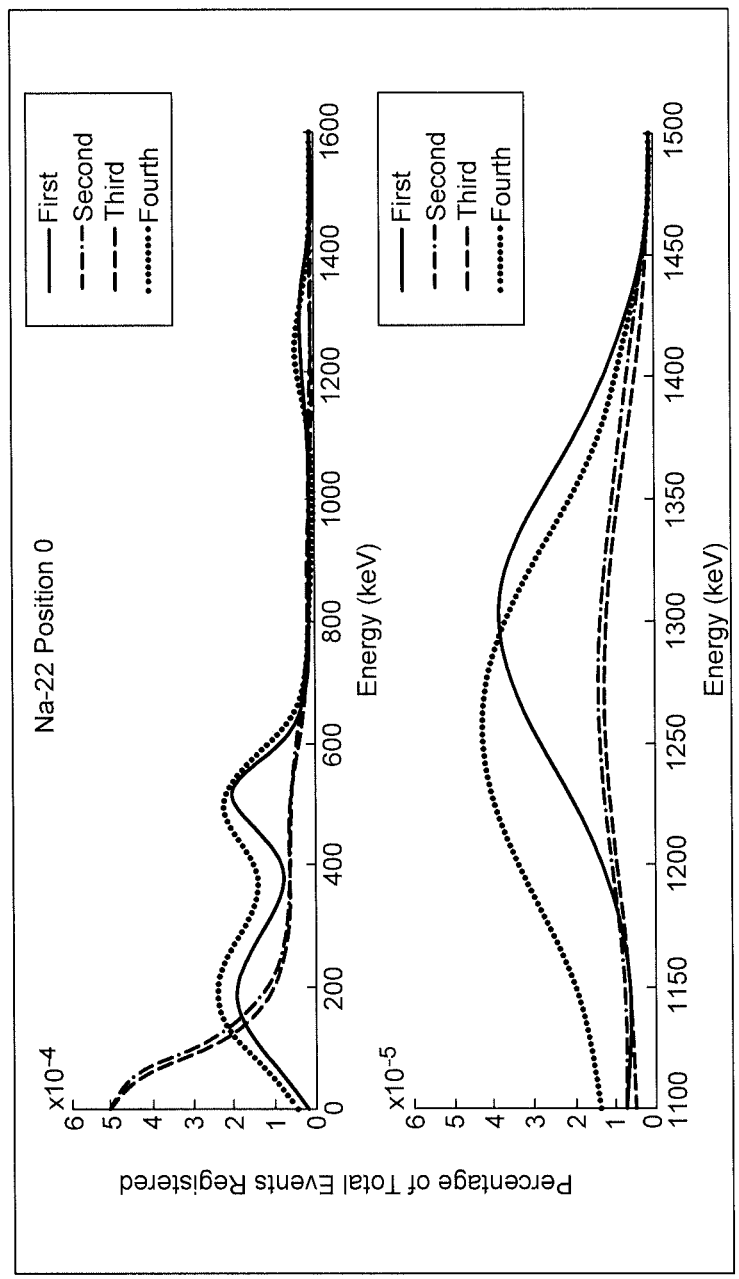
FIGS. 12a-12e are graphs of smooth curve fittings for quadrant responses for a Na-22 source according to an embodiment of the present subject matter.
Figure 12B:
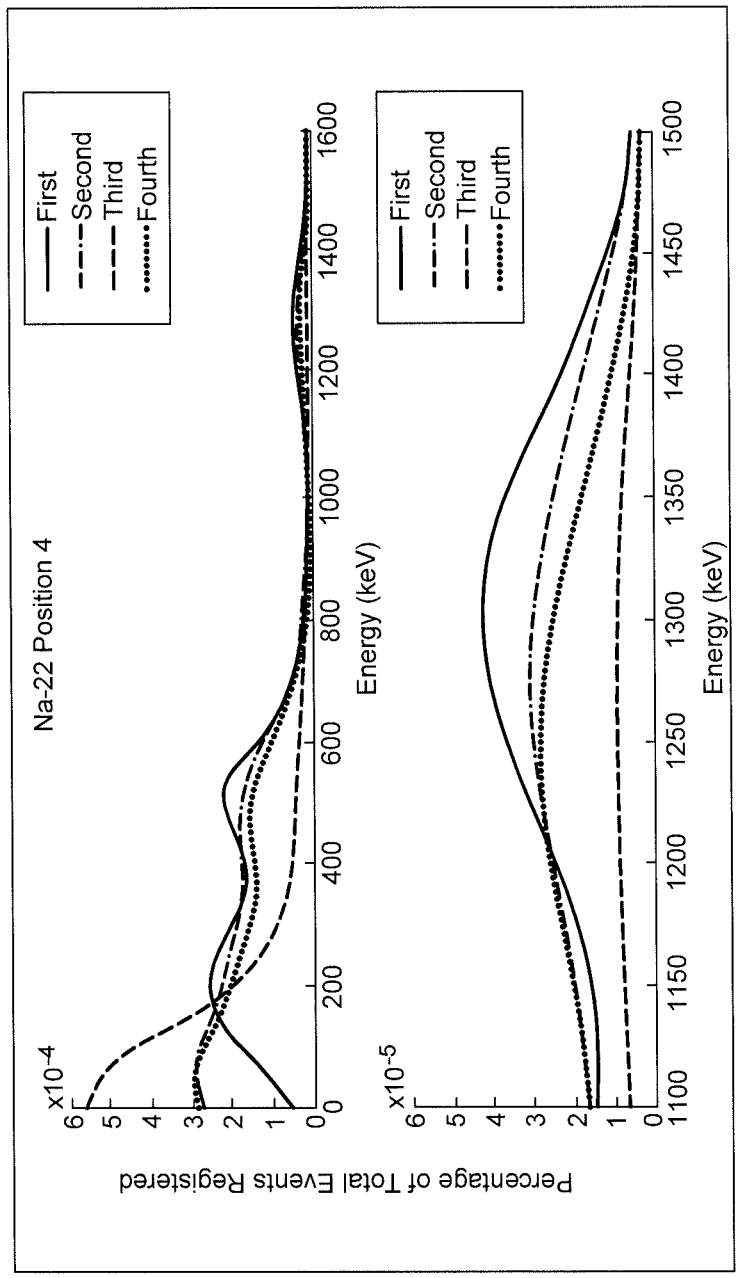
Figure 12C:
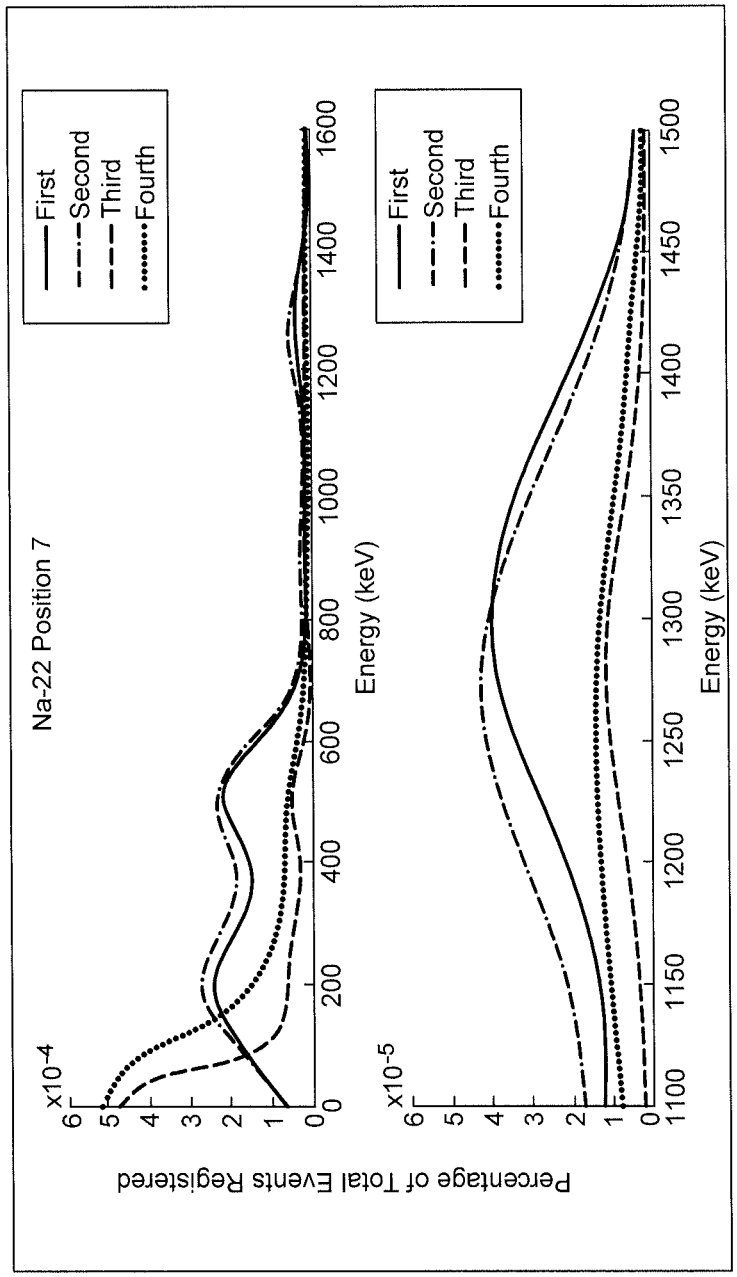
Figure 12D:
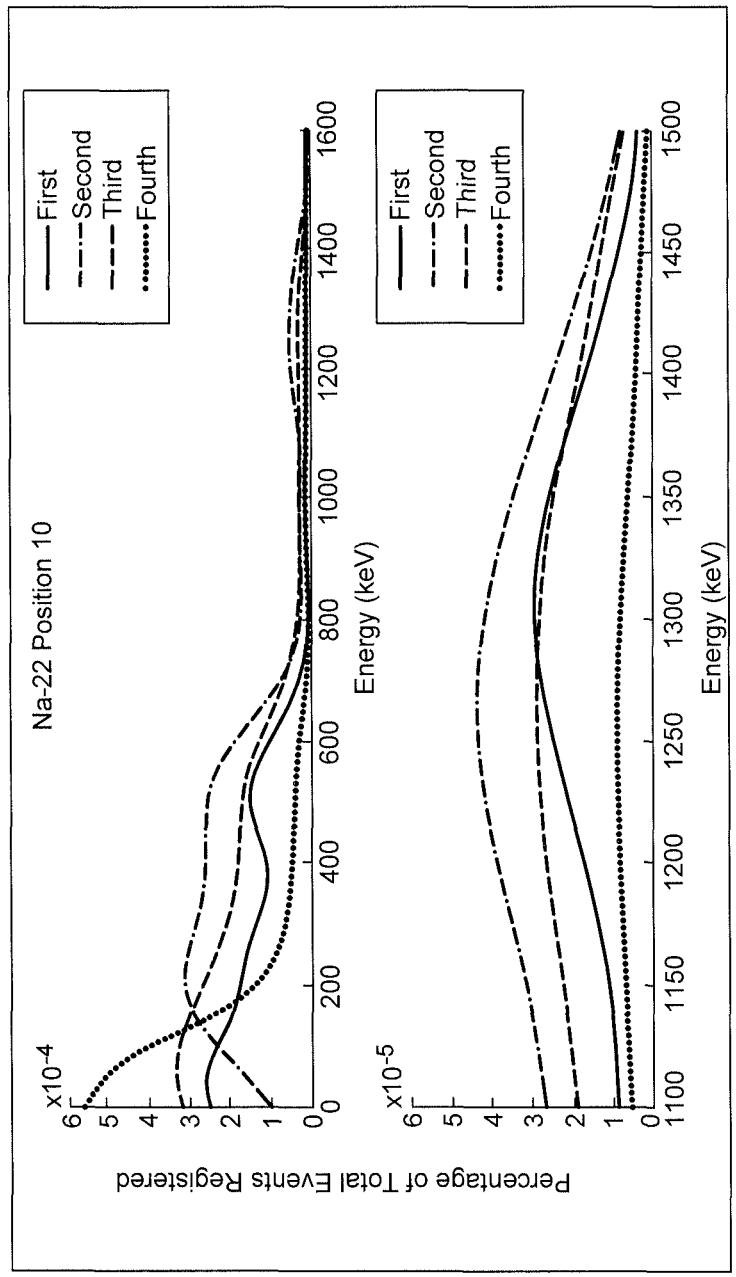
Figure 12E:
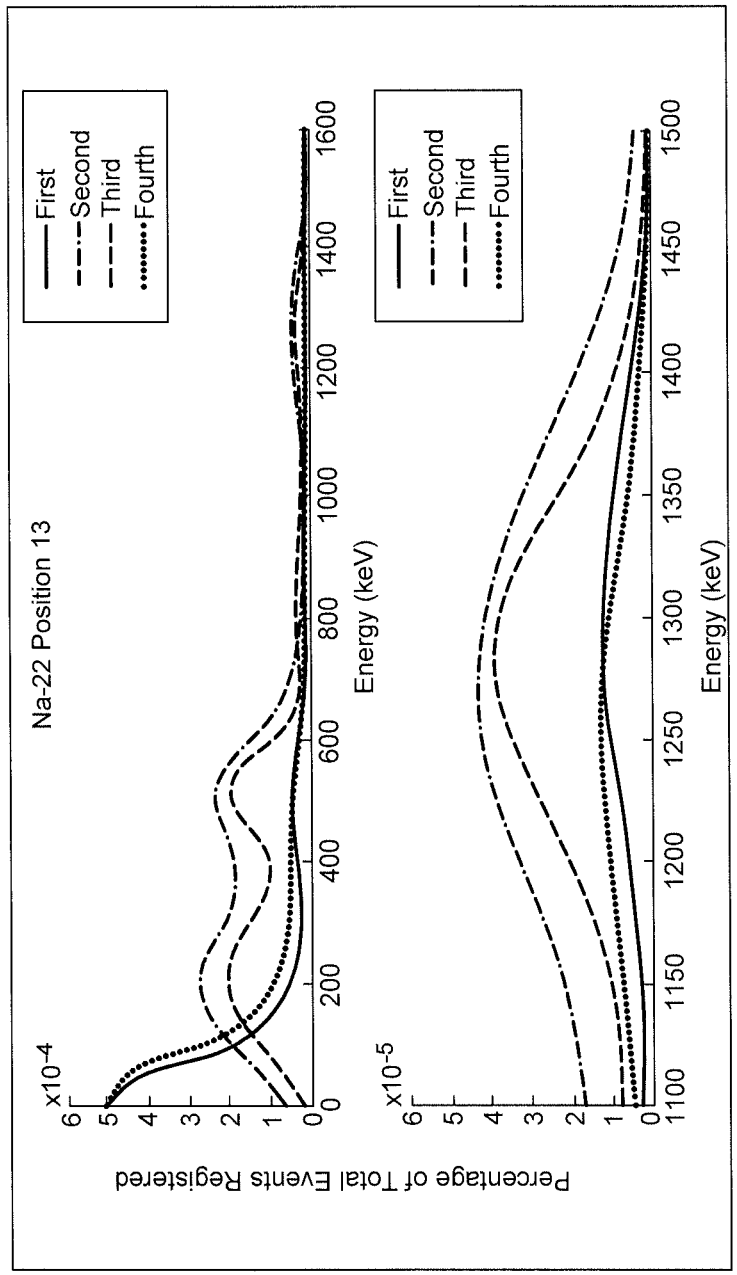
Figure 13A:
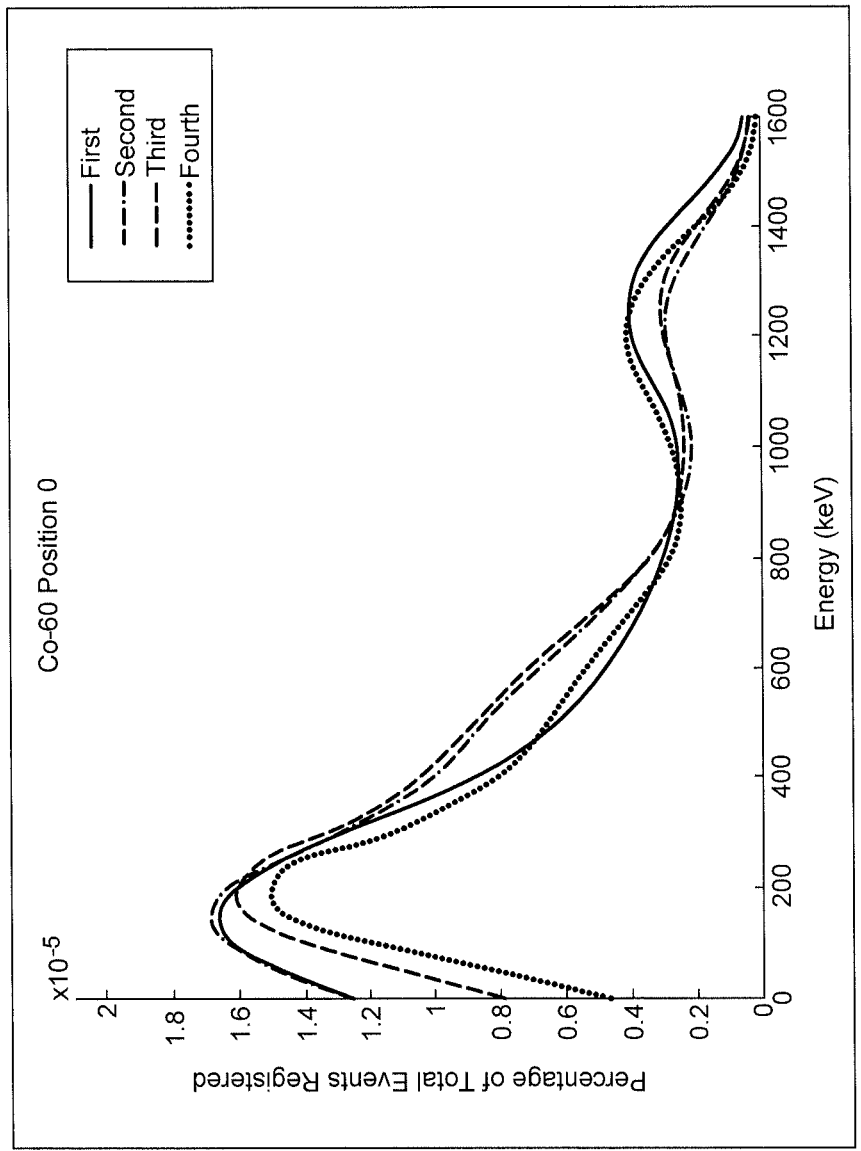
FIGS. 13a-13e are graphs of smooth curve fittings for quadrant responses for a Co-60 source according to an embodiment of the present subject matter.
Figure 13B:
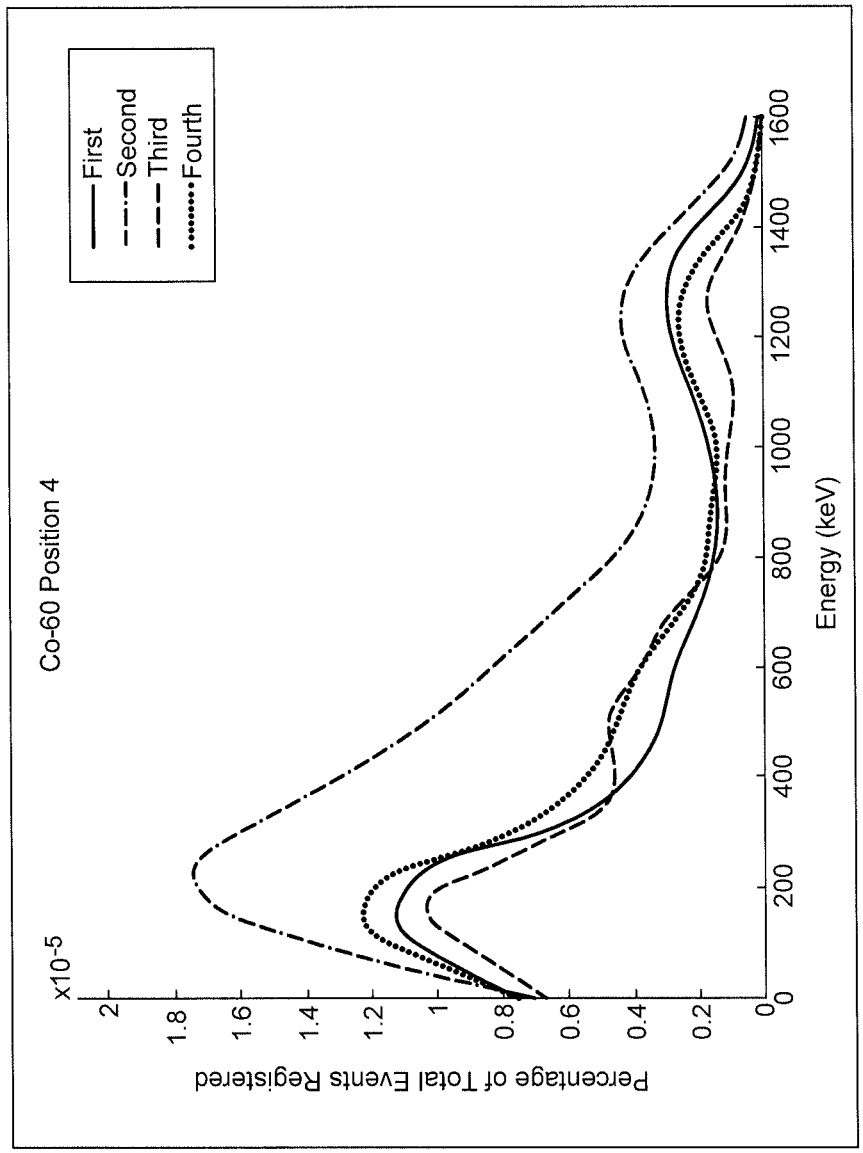
Figure 13C:
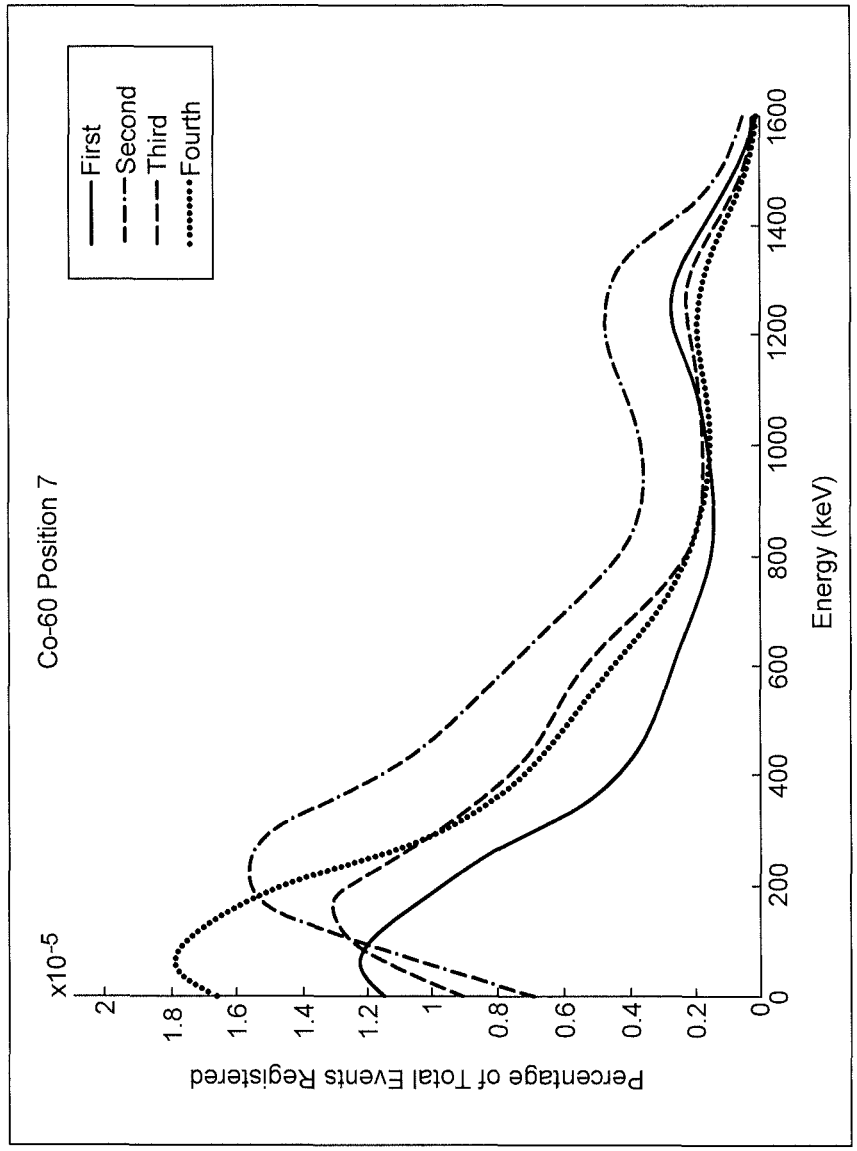
Figure 13D:
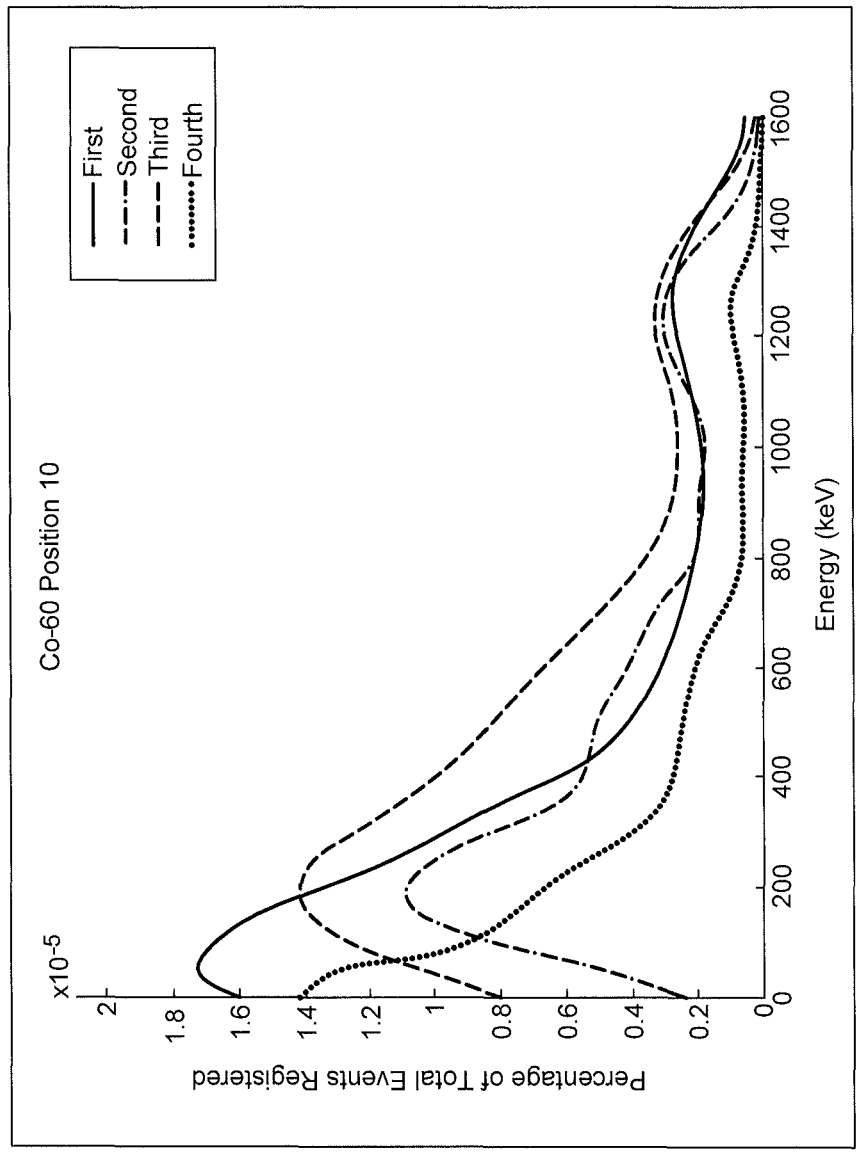
Figure 13E:
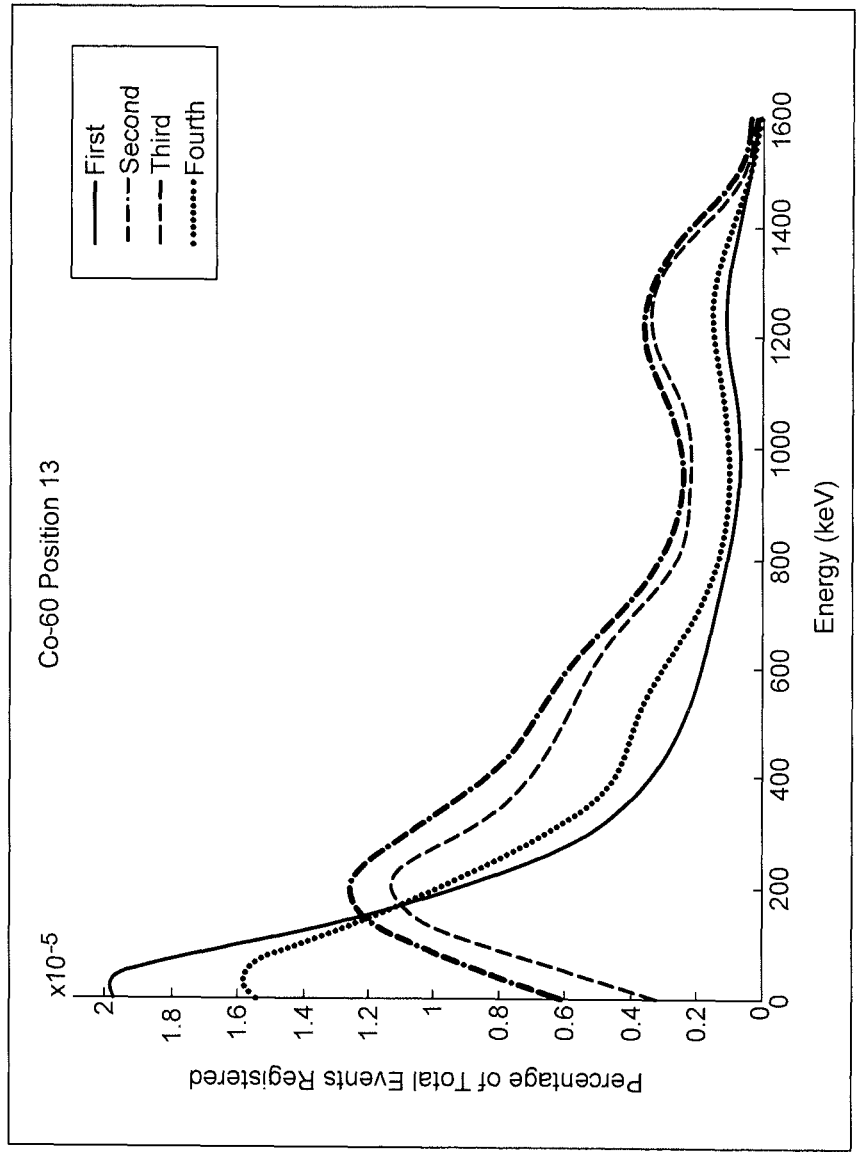

FIG. 9 shows a comparison of differential pulse height spectra at various energies at detector 101 while the source is located at position 0 on the semicircle 206. From FIG. 9 it is clear that the intensity of counts under the various energy peaks decreases as the energy of the incoming particle increases.

Another phenomenon can be observed in the energy range below 0.1 MeV in FIG. 9. Although the intensity under the observed peaks decreases as the energy increases for energies above 0.1 MeV, for energies below 0.1 MeV the trend observed is that the higher the energy within this range, the greater the intensity observed. This phenomenon could be due to more scattered events from other detectors depositing energy into the adjacent detectors.

Model Verification

To verify the model, a Cs-137 gamma source was placed on the model train and moved around the track as shown in FIG. 1. The train was measured to be moving ~0.5 MPH and a PIXIE-4 DAQ system was used to record the data. By splitting the data results into 0.5-second intervals, the track could be segmented as in the MCNP model. Using the resulting data, histograms of counts were made for each location to produce DPHS for the locations. Some of these results are shown in FIGS. 10a-10e which correspond to the source being at position 0, 4, 7, 10, and 13, respectively. From the results shown in FIGS. 10a-10e, one can see that the detector responses are consistent with the model predictions. The different positions shown verified that the detector responses of the detectors closer to the source are greater than the detector responses of the detectors further from the source.

Smooth Histogram Fitting

The current system produces an output that stores events in an ASCII format with attached time stamp and gamma energy for each event. This data can be used to create a histogram of similar energy events, but it is difficult to interpret while displayed as a bar graph and is hard to compare to the smooth curve output of the MCNP model. In order to make the data results easier to compare to the model's results, a kernel smoothing function was used in MATLAB to produce a similar output to the MCNP output. The program works on the basis of taking each data point from the PIXIE output and grouping all of them into bins with variable widths to adjust resolution. After grouping all data points into bins, a probability density function ("pdf") is then created for each bin. The pdf is then normalized for the entire range of data by taking the height value of each bin and dividing by the sum of all bins. This results in the sum of all bins being equal to 1.00 and plots the bin value as a percentage of the total number of events. Each bin is then plotted together to create a smooth curve fit to the histogram with similar form to the MCNP output. These results are shown in FIGS. 11a-11e.

From the results shown in FIGS. 11a-11e, one can see the distinct separation of the detector response peak heights. This allows for a definitive result showing which detector registers the most, least, or the same number of events in energies of concern. For example, at position 0 (FIG. 11a), detectors 101 and 104 register roughly the same highest number of counts. At the same location, detectors 102 and 103 register about the same least number of counts. At position 7 (FIG. 11c), detectors 101 and 102 register the most, whereas detectors 103 and 104 register the least. Analysis of all five positions shown in FIGS. 11a-11e verifies the results from the MCNP model at the same positions shown in FIGS. 5a-5c.

The system was also examined using different energy emitting gamma sources. The sources used for this were 10 μCi Na-22 and 1 μCi Co-60. Utilizing the steps discussed above, a smooth curve fit to a histogram was created for each position examined around the semicircle 206 and show in FIGS. 12a-12e. Since the Na-22 spectrum contains a more prominent 511 keV peak as well as the 1274 keV photopeak, each position's plot in FIGS. 12a-12e contains both a standard spectrum and one with a narrower axis to show the features around 1274 keV. From FIGS. 12a-12e, one can see that the features of each position's output match what is expected. Since two peaks can be observed for Na-22, both peaks can be examined independently to see that the results compare to those expected from the model near both energies.

FIGS. 13a-13e show the smooth curve fitting for Co-60. From FIGS. 13a-13e, one can see that there is only one prominent peak in the 1000-1400 keV energy range. This does not correspond to a normal differential pulse height spectrum one would expect from Co-60 with peaks at both 1173 and 1332 keV. This anomaly is due to the bin width set to make the x-axis. The bin width is coarse (wide) for this particular experiment to make the comparison between the four detectors easier to interpret. For all energy peaks examined, the results matched the modeled energies near those regions for the most part. The discrepancy occurs around the top of the semicircle 206 for the Co-60 trials. At the corners (positions 4 and 10), the detector furthest from the source (detectors 103 and 104, respectively) had the lowest registered intensity as expected. The other three detectors did not have enough separation to distinguish which were the highest or the intensities were different than expected. Further examination showed that the most likely reason for this discrepancy from the model is because of the weak source strength. This only allowed for less than 500 counts under each of the peaks with the highest intensities.

Fuzzy Logic Applications for the System

With the validity of the system being verified by modeling and experimentation, the next step in the process is to evaluate the data results to produce a usable result. In the following exemplary application, results showing detector responses are similar over a range of energies for each position and detector which can be used to create an evaluation system that is capable of determining the source position. The system needs to be able to respond generally the same and produce similar results for all energies of concern. To accomplish this, a fuzzy logic system was produced in MATLAB to use the intensity levels of each detector relative to the others at each position.

The first step is to evaluate the antecedent for each rule. In this exemplary system, this is accomplished by examining the gross counts under the radiation energy peak of interest relative to each other for each position. To simplify the system, five choices were used for possible levels of intensity in a particular embodiment. One of ordinary skill in the art will readily understand that other levels may be chosen and that the levels chosen herein for this exemplary discussion are non-limiting. The levels chosen in the embodiment shown in FIGS. 14a-14d are high ("H"), mid/high ("MH"), mid ("M"), low/mid ("LM"), and low ("L"). FIGS. 14a-14d are plots for energy levels of 100 keV, 350 keV, 1200 keV, and 2700 keV, respectively. FIGS. 14a-14d plot DPHS intensities as determined at detectors 101, 102, 103, and 104 (labeled as detectors 1, 2, 3, and 4, respectively) as functions of position. On the right-hand side of FIGS. 14a-14d are shown the levels chosen for each plot. Note that the chosen levels may be different for each energy level.

Figure 14A:
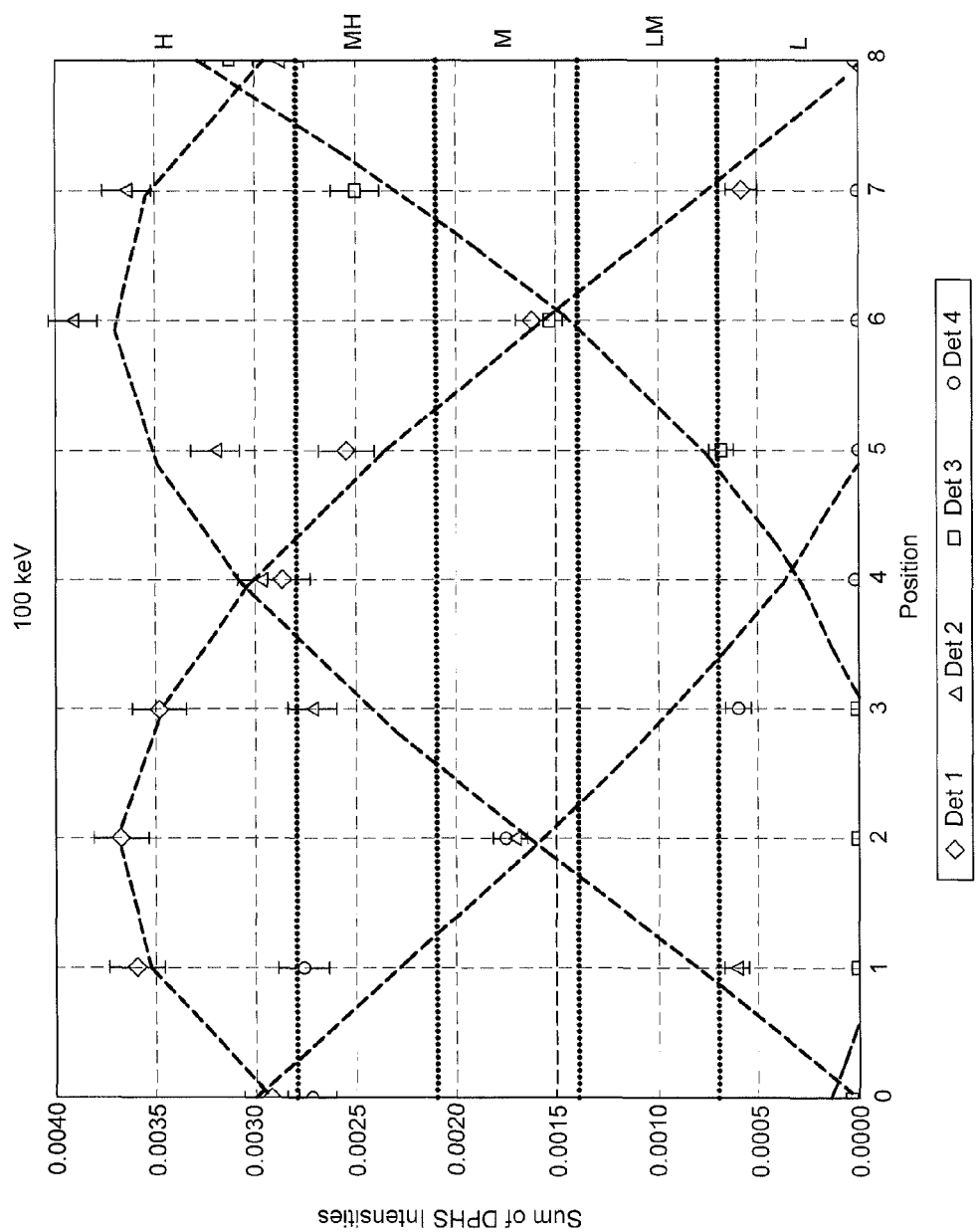
FIGS. 14a-14d are illustrative graphs showing possible levels of response heights at various energy levels for use with a fuzzy logic system according to an embodiment of the present subject matter.
Figure 14B:
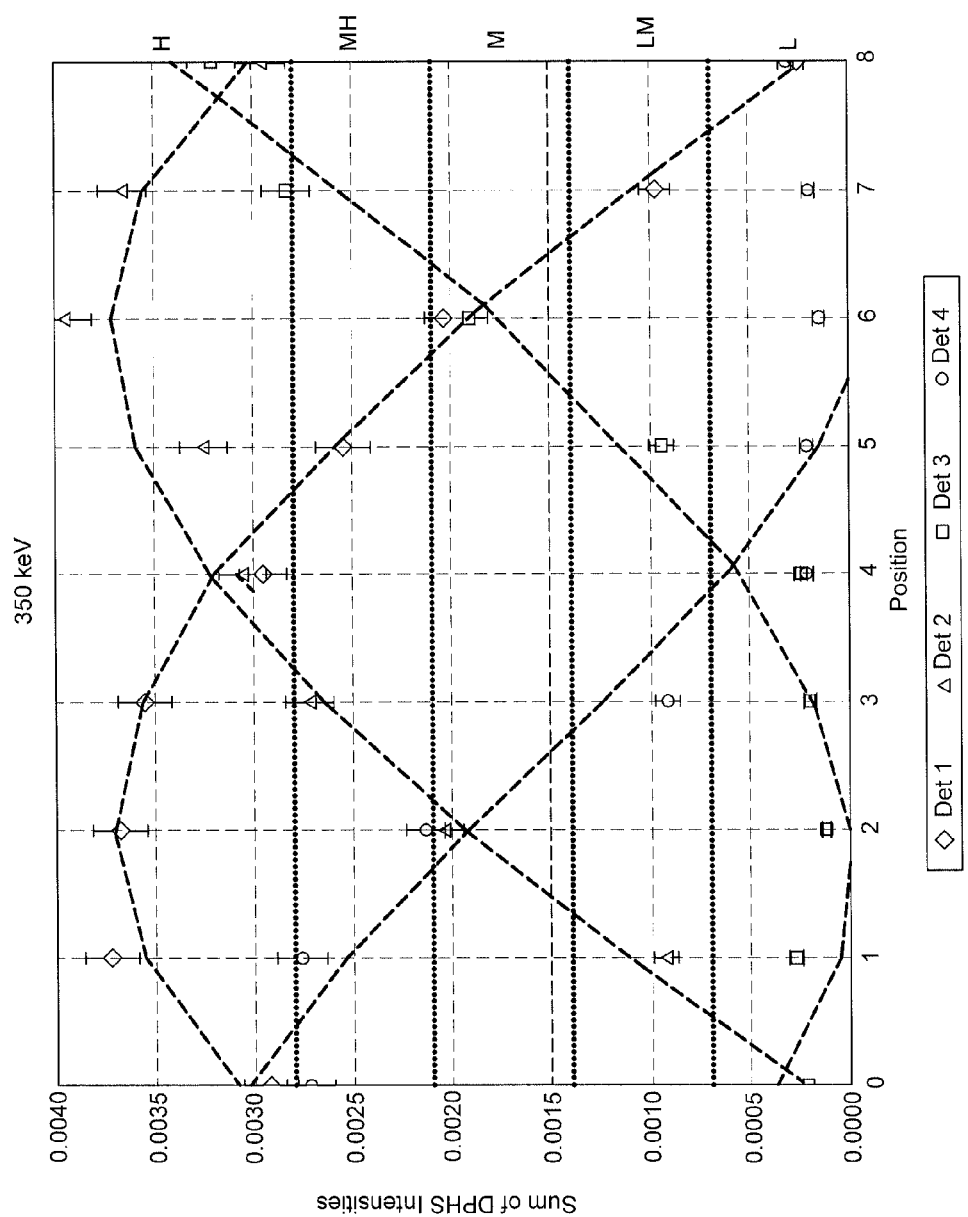
Figure 14C:
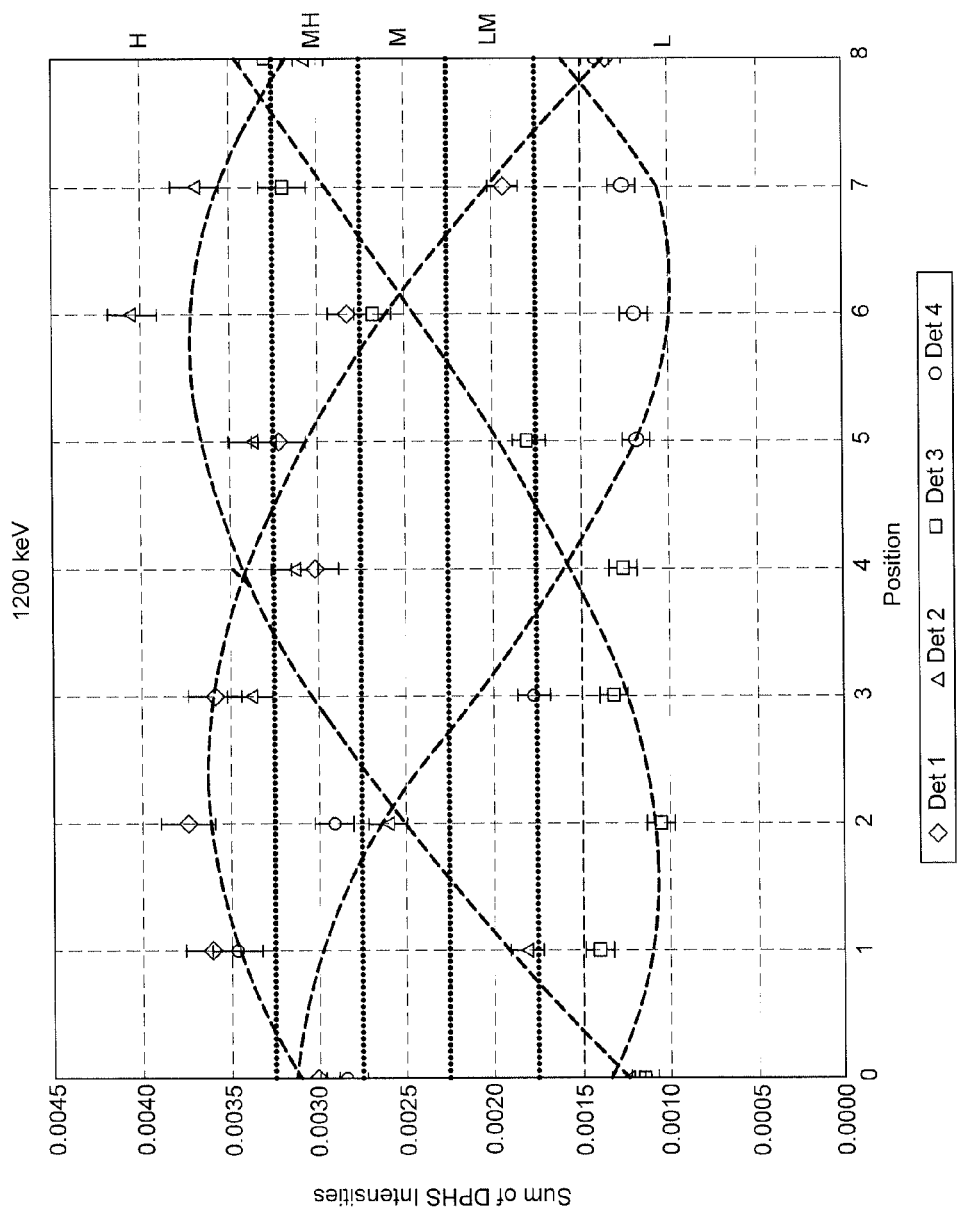
Figure 14D:
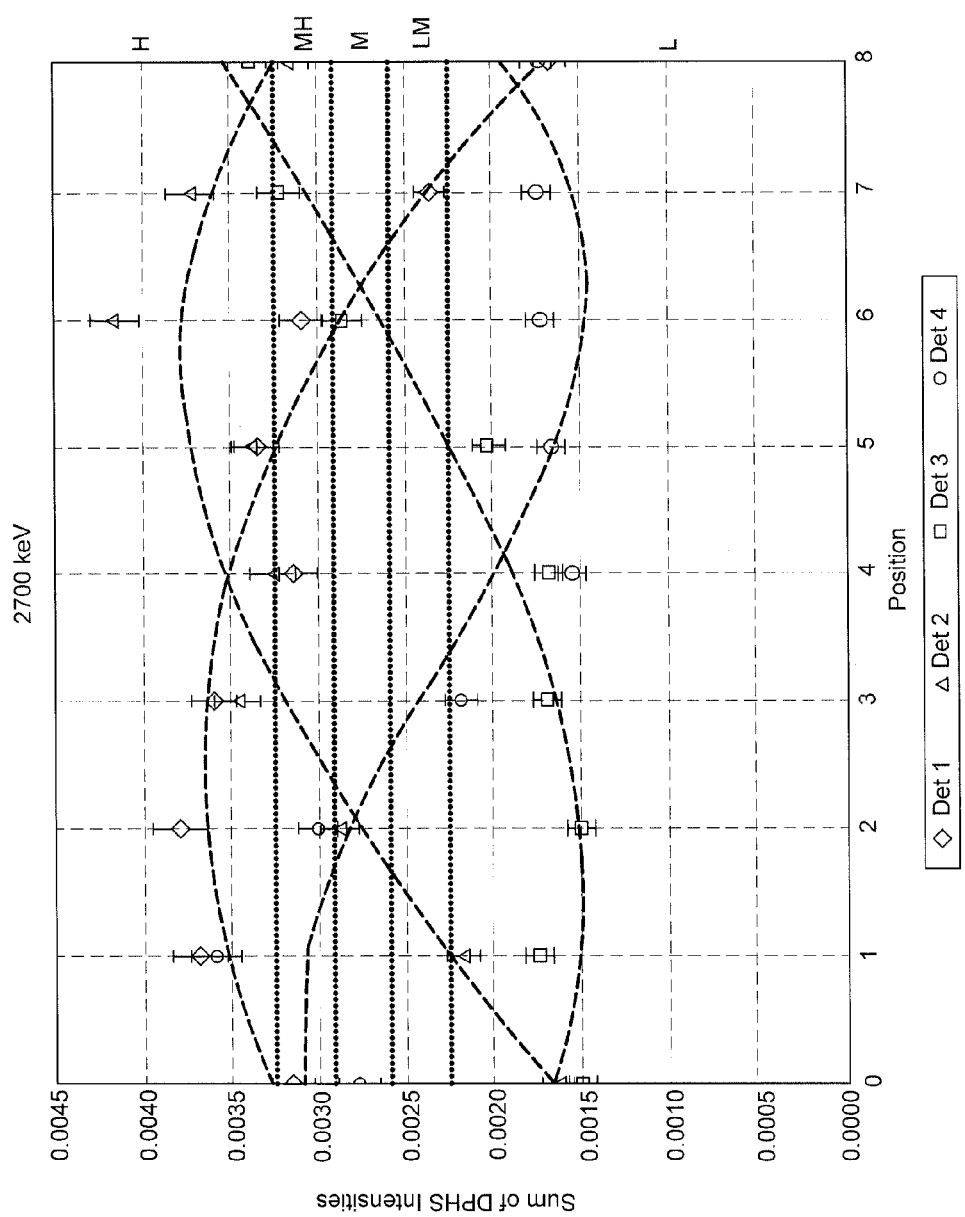

Looking now to FIG. 14a, each position along the x-axis has a distinct set of response heights for the four detectors. For example, at position 1, detector 101 (labeled as "det 1") is in the high ("H") range, detector 102 is in the low/mid ("LM") range, detector 103 is in the low ("L") range, and detector 104 is in the mid/high ("MH") range. With this being the only position that has this configuration, the conclusion is that the source location is position 1. In reality, the intensities may not be exactly as entered into the system. For instance, at the initial position (position 1), one of the three detectors may produce an erred result not expected for that position. Instances like this are controlled by the second step of this fuzzy logic approach, which is to aggregate conclusions. This step combines the outputs for each rule into a single fuzzy set using a fuzzy aggregation operator. For this step, the aggregation operator used is "maximum". The final step in this process is defuzzification, such as centroid defuzzification. During this step, the system turns a fuzzy set output into a numerical value. Centroid defuzzification returns the center of the areas under the resulting fuzzy sets and combines them to return one numerical result or position. An input is required for each detector to produce an accurate result of the source position. Using the inputs for each detector, those inputs are compared to the rules set in the fuzzy logic system. These rules are set up in a format similar to the following:

If Det 1 is high, And Det 4 is mid/high, And Det 2 is low/mid, And Det 3 is low, Then the result is position 1.

A benefit of this system is that each position is distinct from the others as to how the detectors respond according to each other. In other words, if all And statements are satisfied, the results are capable of producing one distinct position along the semicircle 206. Due to this, each position has to have its own set of rules, where there is at least one rule per position.

A non-limiting, exemplary rule set is shown in FIG. 15. With this system, one can make as many rules as desired. Typically, the more rules there are that can be evaluated, the more precise the results, i.e., the determination of the position of the source.

In an embodiment, the system is set up so that the intensities correspond to the following values on a scale of 0-100: High: 100; Mid/High: 75; Mid: 50; Low/Mid: 25; and Low: 0. Those of skill in the art will readily understand that other values/scales are contemplated by the present disclosure. An advantage of this system is that it can take into account the fact that real world results are not always ideal. This means that if one detector resulted in an intensity that looked more like 85 (between High and Mid/High), the system would use the rules and take that into account to give an accurate result even though the discrepancy exists.

The results from smooth curve fittings for the three isotopes (Cs-137, Na-22, and Co-60) were examined. A numerical value on a scale from 0-100 corresponding to the intensities was assigned for each detector 101-104 at each position 0-13 and were input in an exemplary fuzzy logic algorithm using the following format: [Detector 1 Intensity|Detector 2 Intensity|Detector 3 Intensity|Detector 4 Intensity]

The resulting inputs for the smooth curves are shown in FIG. 16. Using these inputs for each of the source isotopes listed, the fuzzy logic system gave a resulting position for each input in FIG. 16 as shown. The resulting fuzzy logic output positions corresponding to the FIG. 16 inputs are shown in FIG. 17. From FIG. 17, it can be concluded that the fuzzy logic system produces rather accurate position results when compared to the expected, or known, positions. Even with the Co-60 irregularities, the resulting positions are still within 45° of the actual positions. Other than these few instances, the variances from the actual positions are minimal and the results match well.

The present disclosure contemplates a system and method for providing real time results for source location as well as post processing. In real world applications, the process would need to create almost immediate results to provide useful data and may include a programmable logic device that can perform on-the-fly processing based on the same methodology described above. A practical use for such a real-time system would be to mount the system on a vehicle which would permit detection and location of radioactive sources while moving. For such an application, the detectors would need to be designed to locate a source from greater distances than as described herein, and such an application is contemplated herein by, for example, the use of plastic scintillators that are more sensitive to incoming particles. As discussed above, using a four-quadrant square setup of detectors allows for shielding of detectors farther away from the source by those closer to it. Comparing number of events detected by an individual detector to the other three detectors allows the intensities of each to be determined with respect to the others. Splitting the semicircle into segments allows each segment to have a specific intensity result for the system. This fact allows a fuzzy logic system to be created using the ideal MCNP results to make a unique detector response set for each location. Using the intensity results from smooth curve fitting to histograms, the fuzzy logic system produces position results very close to the known locations.

Figure 18:
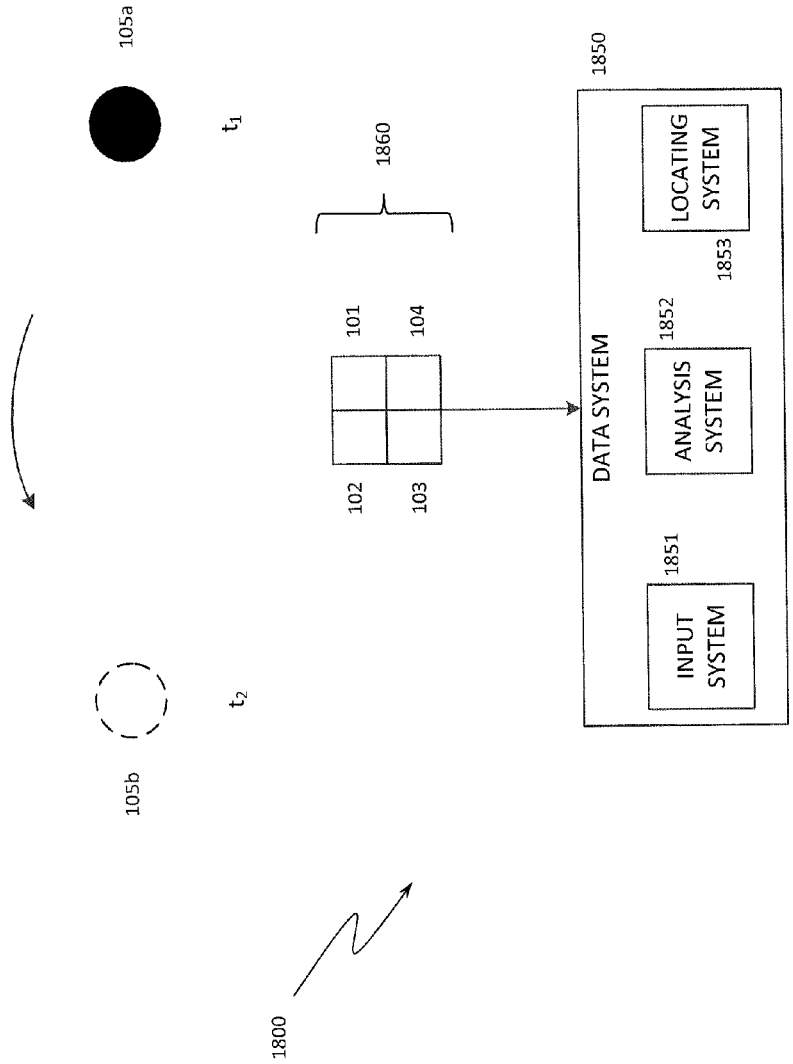
FIG. 18 is a functional block diagram for a system for determining a location of a radioactive source according to an embodiment of the present subject matter.

With attention drawn to FIG. 18, a system 1800 for determining a location of a radioactive source is depicted. A detector array 1860 including a plurality of detectors 101-104 is disposed in a predetermined fixed arrangement. In the particular embodiment shown, a detector array 1860 including detectors 101-104 are arranged in a square format although other formats are contemplated as well as a different number of detectors in the detector array. The detector array 1860 is placed such that at a first time $t_1$ a first detector 101 in the array is disposed between a second detector 103 in the array and a radioactive source 105, at position 105a, and, due to relative motion between the detector array and the radioactive source, at a second time $t_2$ the first detector 101 is not disposed between the second detector 103 and the radioactive source 105 at position 105b. While FIG. 18 depicts the radioactive source moving around the detector array, it is contemplated herein that the array may be mobile and may move around a fixed or mobile radioactive source. In a further embodiment, radioactive shielding is disposed between two or more of the detectors in detector array 1860.

The detectors in detector array 1860 are typically the same but one or more may be different. One or more of the detectors in the array, or all the detectors in the array, may be a sodium iodide detector, a high purity germanium detector, or a plastic scintillator detector.

The system 1800 further includes a data system 1850 operatively connected to each of detectors 101-104 in detector array 1860. The data system 1850 includes an input system 1851 which receives from each one of detectors 101-104 a signal representative of a number of radioactive particles from the radioactive source 105 detected by each of the detectors. The data system 1850 also includes an analysis system 1852 which compares the signals received from each one of the detectors 101-104, and a locating system 1853 which determines a location of the radioactive source 105 based at least in part on the comparison of the signals by the analysis system 1852. In an embodiment, the location determined by the locating system 1853 is a line of bearing from the centroid of the detector array 1860.

In an embodiment, the radioactive particles emitted by the source 105 are gamma rays, and in a further embodiment, those gamma rays have an energy between 100 keV and 2700 keV.

In another embodiment, the analysis system 1852 assigns a numerical value on a predetermined scale to each signal received from detectors 101-104. The location system 1853 determines the location of the radioactive source 105 based either on a comparison of the assigned numerical values or based on a comparison of the assigned numerical values to a pre-existing database of numerical values.

In a further embodiment, the locating system 1853 includes a processor programmed to perform the steps of: fuzzifying an input signal from a first detector 101 using a first predetermined condition to thereby determine a first fuzzy input; fuzzifying an input signal from a second detector 103 using a second predetermined condition to thereby determine a second fuzzy input; determining a membership value from the first and second fuzzy inputs; determining a result function based on the first and second predetermined conditions; applying the membership value to the determined result function to thereby determine a result; aggregating a plurality of results to thereby determine a final result; and defuzzifying the final result. In another embodiment, the defuzzifying step includes using a mean of maxima method or using a center of gravity method.

Figure 19:
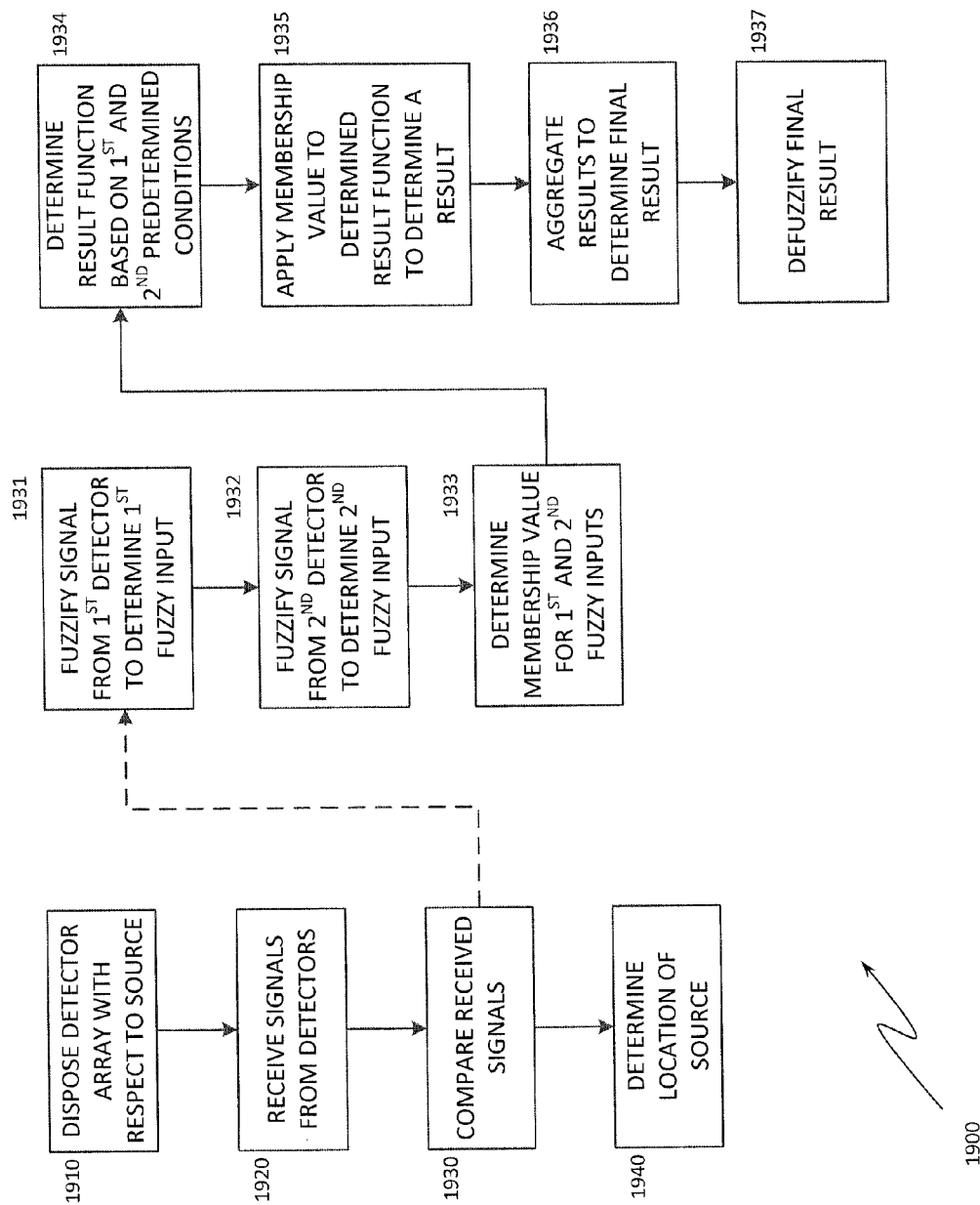
FIG. 19 is a flow chart for methods for determining a location of a radioactive source according to embodiments of the present subject matter.

Considering now FIG. 19, a flow chart 1900 is presented illustrating embodiments for a method for determining a location of a radioactive source. At block 1910, a detector array comprising a plurality of detectors in a predetermined fixed arrangement is disposed such that at a first time a first of the plural detectors is located between a second of the plural detectors and a radioactive source and, due to relative motion between the detector array and the radioactive source, at a second time said first detector is not located between the second detector and the radioactive source. At block 1920, a signal is received from each one of the plural detectors where the signal is representative of a number of radioactive particles from the radioactive source detected by the respective one detector. At block 1930, the received signals are compared. At block 1940, a location of the radioactive source is determined based at least in part on the comparison of the signals from the detectors.

In an embodiment, the step of comparing signals from the detectors includes assigning a numerical value on a predetermined scale to each signal received from the detectors. In a further embodiment, the step of determining a location includes either comparing the assigned numerical values from the received signals, or comparing the assigned numerical values to a pre-existing database of numerical values.

In yet a further embodiment, in block 1930 the step of comparing signals received from each of the plural detectors includes: at block 1931, fuzzifying an input signal from the first detector using a first predetermined condition to thereby determine a first fuzzy input; at block 1932, fuzzifying an input signal from the second detector using a second predetermined condition to thereby determine a second fuzzy input; at block 1933, determining a membership value from the first and second fuzzy inputs; at block 1934, determining a result function based on the first and second predetermined conditions; at block 1935, applying the membership value to the determined result function to thereby determine a result; at block 1936, aggregating a plurality of results to thereby determine a final result; and at block 1937, defuzzifying the final result.

Certain embodiments of the present disclosure may be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile electronic laptop or tablet device.

Computer readable media suitable for storing computer program instructions and data include all forms of data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A system for determining a location of a radioactive source, comprising:
    a detector array comprising a plurality of detectors disposed in a predetermined fixed arrangement wherein at a first time a first of said plural detectors is disposed between a second of said plural detectors and a radioactive source and, due to relative motion between said detector array and the radioactive source, at a second time said first detector is not disposed between said second detector and the radioactive source; and
    a data system operatively connected to each of said plurality of detectors, said data system comprising:
    an input system which receives from each one of said plural detectors a signal representative of a number of radioactive particles from the radioactive source detected by the respective one detector;
    an analysis system which compares the signals received from said each one of the plural detectors; and
    a locating system which determines a location of the radioactive source based at least in part on the comparison of the signals.

2. The system of claim 1 wherein the plurality of detectors is four.

3. The system of claim 2 wherein the predetermined fixed arrangement is a square.

4. The system of claim 1 wherein the location is a line of bearing from a centroid of the detector array.

5. The system of claim 1 wherein said detector array is mobile.

6. The system of claim 1 wherein the radioactive particles are gamma rays.

7. The system of claim 6 wherein the gamma rays have an energy between 100 keV and 2700 keV.

8. The system of claim 1 wherein said analysis system assigns a numerical value on a predetermined scale to each signal.

9. The system of claim 8 wherein said location system determines the location of the radioactive source based on a comparison of the assigned numerical values.

10. The system of claim 8 wherein said location system locates the radioactive source based on a comparison of the assigned numerical values to a pre-existing database of numerical values.

11. The system of claim 1 wherein radioactive shielding is disposed between said first and said second detectors.

12. The system of claim 1 wherein one of said plurality of detectors is a sodium iodide detector.

13. The system of claim 1 wherein one of said plurality of detectors is a high purity germanium detector.

14. The system of claim 1 wherein one of said plurality of detectors is a plastic scintillator detector.

15. The system of claim 1 wherein the locating system includes a processor programmed to perform the steps of:
    (i) fuzzifying an input signal from the first detector using a first predetermined condition to thereby determine a first fuzzy input;
    (ii) fuzzifying an input signal from the second detector using a second predetermined condition to thereby determine a second fuzzy input;
    (iii) determining a membership value from the first and second fuzzy inputs;
    (iv) determining a result function based on the first and second predetermined conditions;
    (v) applying the membership value to the determined result function to thereby determine a result;
    (vi) aggregating a plurality of results to thereby determine a final result; and
    (vii) defuzzifying the final result.

16. The system of claim 15 wherein the defuzzifying step includes using a mean of maxima method.

17. The system of claim 15 wherein the defuzzifying step includes using a center of gravity method.

18. A method for determining a location of a radioactive source, the method comprising the steps of:
    (a) disposing a detector array comprising a plurality of detectors in a predetermined fixed arrangement such that at a first time a first of said plural detectors is located between a second of said plural detectors and a radioactive source and, due to relative motion between said detector array and the radioactive source, at a second time said first detector is not located between said second detector and the radioactive source;

(b) receiving from each one of said plural detectors a signal representative of a number of radioactive particles from the radioactive source detected by the respective one detector;

(c) comparing the signals received from said each one of the plural detectors; and (d) determining a location of the radioactive source based at least in part on the comparison of the signals.

19. The method of claim 18 wherein the plurality of detectors is four.

20. The method of claim 19 wherein the predetermined fixed arrangement is a square.

21. The method of claim 18 wherein the location is a line of bearing from a centroid of the detector array.

22. The method of claim 18 wherein said detector array is mobile.

23. The method of claim 18 wherein the radioactive particles are gamma rays.

24. The method of claim 23 wherein the gamma rays have an energy between 100 keV and 2700 keV.

25. The method of claim 18 wherein the step of comparing signals includes assigning a numerical value on a predetermined scale to each signal.

26. The method of claim 25 wherein the step of determining a location includes comparing the assigned numerical values.

27. The method of claim 25 wherein the step of determining a location includes comparing the assigned numerical values to a pre-existing database of numerical values.

28. The method of claim 18 further comprising the step of disposing radioactive shielding between the first and the second detectors.

29. The method of claim 18 wherein one of the plurality of detectors is a sodium iodide detector.

30. The method of claim 18 wherein one of the plurality of detectors is a high purity germanium detector.

31. The method of claim 18 wherein one of the plurality of detectors is a plastic scintillator detector.

32. The method of claim 18 wherein the step of comparing signals received from said each of the plural detectors includes the steps of:

(i) fuzzifying an input signal from the first detector using a first predetermined condition to thereby determine a first fuzzy input;

(ii) fuzzifying an input signal from the second detector using a second predetermined condition to thereby determine a second fuzzy input;

(iii) determining a membership value from the first and second fuzzy inputs;

(iv) determining a result function based on the first and second predetermined conditions;

(v) applying the membership value to the determined result function to thereby determine a result;

(vi) aggregating a plurality of results to thereby determine a final result; and (vii) defuzzifying the final result.

33. The method of claim 32 wherein the defuzzifying step includes using a mean of maxima method.

34. The method of claim 32 wherein the defuzzifying step includes using a center of gravity method.

* * * * *